(12) United States Patent
Malenfant et al.

(10) Patent No.: US 7,893,165 B2
(45) Date of Patent: Feb. 22, 2011

(54) METAL-CONTAINING INORGANIC BLOCK COPOLYMERS

(75) Inventors: Patrick Roland Lucien Malenfant, Clifton Park, NY (US); Andrea Peters, Clifton Park, NY (US); Julin Wan, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 898 days.

(21) Appl. No.: 11/464,125

(22) Filed: Aug. 11, 2006

(65) Prior Publication Data

US 2008/0039589 A1 Feb. 14, 2008

(51) Int. Cl.
C04B 35/56 (2006.01)
C08F 293/00 (2006.01)
C08F 275/00 (2006.01)

(52) U.S. Cl. .............. 525/288; 428/427; 428/428; 525/79; 525/88; 525/289; 525/474; 528/4

(58) Field of Classification Search .......... 525/88, 525/105, 106, 326.1, 326.5, 474, 242, 288, 525/289, 431, 436, 446, 534, 540, 79, 464; 501/88, 96.2; 528/4; 428/427, 428; 523/209, 523/221

See application file for complete search history.

(56) References Cited

U.S. PATENT DOCUMENTS

| | | | | |
|---|---|---|---|---|
| 5,037,898 A | * | 8/1991 | Dangayach et al. | 525/415 |
| 5,844,052 A | * | 12/1998 | Keller et al. | 525/474 |
| 5,986,032 A | * | 11/1999 | Keller et al. | 528/5 |
| 6,495,483 B1 | | 12/2002 | Keller et al. | |
| 6,592,991 B1 | * | 7/2003 | Wiesner et al. | 428/404 |
| 2005/0036931 A1 | | 2/2005 | Garcia et al. | 423/345 |
| 2007/0099790 A1 | * | 5/2007 | Wan et al. | 501/88 |
| 2007/0099791 A1 | * | 5/2007 | Wan et al. | 501/88 |

FOREIGN PATENT DOCUMENTS

WO WO 9414725 A1 * 7/1994
WO WO 00/55218 9/2000

OTHER PUBLICATIONS

Clay, R. T. et al Supramolecular Science vol. 2 pp. 183-191 (Sep. 1995).*
Wan, et al., "Nanostructured Non-oxide Ceramics Templated via Block Copolymer Self-Assembly," General Electric Global Research Center, May 27, 2005 (5 pages).
Garcia, et al., "Ordered Mesoporous Ceramics Stable up to 1500° C from Diblock Copolymer Mesophases," J. Am. Chem. Soc., 2004, No. 126, pp. 14708-14709.
Castle, et al., "Synthesis of Block Copolymers by Changing Living Anionic Polymerization into Living Ring Opening Metathesis Polymerization," Macromolecules, 2004, No. 37, pp. 2035-2040.
Wei, et al., "New Routes to Organodecaborane Polymers via Ruthenium-Catalyzed Ring-Opening Metathesis Polymerization," Organometallics, 2004, No. 23, pp. 163-165.
Garcia, et al., "Synthesis and Characterization of Block Copolymer/ Ceramic Precursor Nanocomposites Based on a Polysilazane," Dept. of Materials Science & Engineering, Cornell University, May 5, 2003, pp. 3346-3350.
Chan, et al., "Toward Highly Metallized Polymers: Synthesis and Characterization of Silicon-Bridged [1]Ferrocenophanes with Pendent Cluster Substituents," Organometallics, 2003, No. 22, pp. 3796-3808.
Choi, et al., "Controlled Living Ring-Opening-Metathesis Polymerization by a Fast-Initiating Ruthenium Catalyst," Angew. Chem. Int. Ed., No. 42, 2003, pp. 1743-1746.
Brust, et al., "Synthesis of Thiol-derivatised Gold Nanoparticles in a Two-phase Liquid-Liquid System," J. Chem. Soc., Chem. Commun., 1994, pp. 801-802.
Chan, et al., "Synthesis of Palladium and Platinum Nanoclusters within Microphase-Separated Diblock Copolymers," Chem. Mater., No. 4, 1992, pp. 885-894.
Bockstaller, Michael R. et al., Size-Selective Organization of Enthalpic Compatibilized Nanocrystals in Ternary Block Copolymer/Particle Mixtures, J. Am. Chem. Soc., vol. 125, pp. 5276-5277.

* cited by examiner

*Primary Examiner*—Irina S. Zemel
*Assistant Examiner*—Jeffrey Lenihan
(74) *Attorney, Agent, or Firm*—Paul J. DiConza

(57) ABSTRACT

There are provided in accordance with embodiments of the invention metal-containing inorganic block copolymers, structures formed by self-assembly of such copolymers, and metal-containing ceramics which may be formed from such copolymers and/or structure. Methods for making such copolymers, structures and ceramics are also provided. Other embodiments are also disclosed.

13 Claims, 36 Drawing Sheets

R = decaborane or H

R = H, CH=CH2

Scheme 3

Scheme 4

Scheme 5

Scheme 6

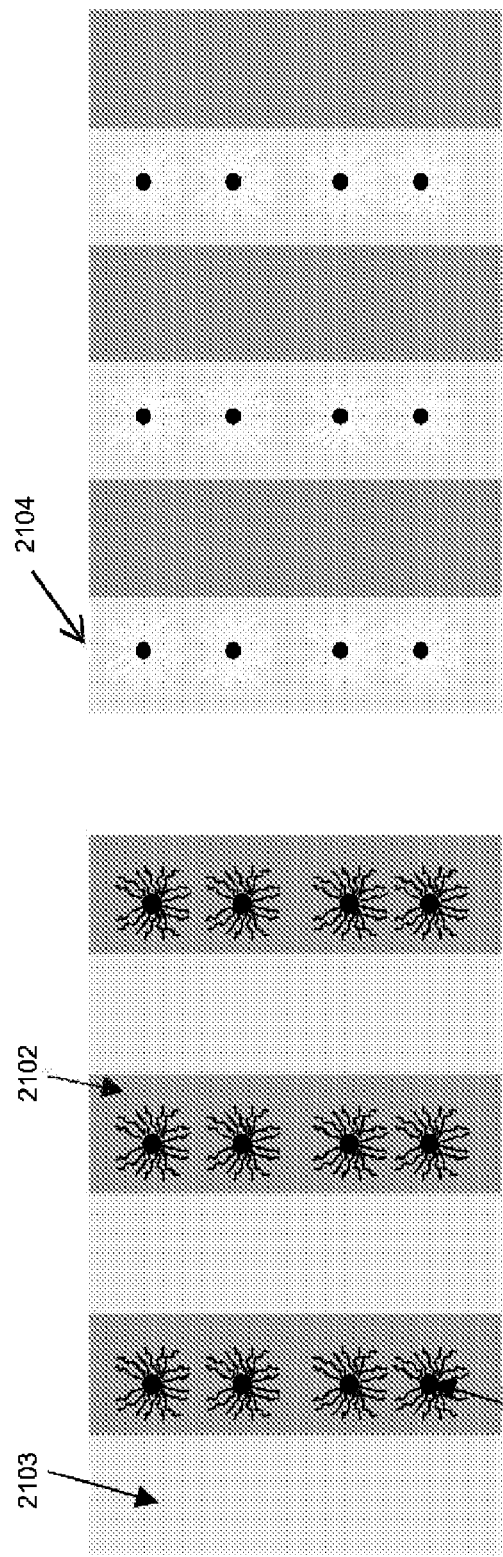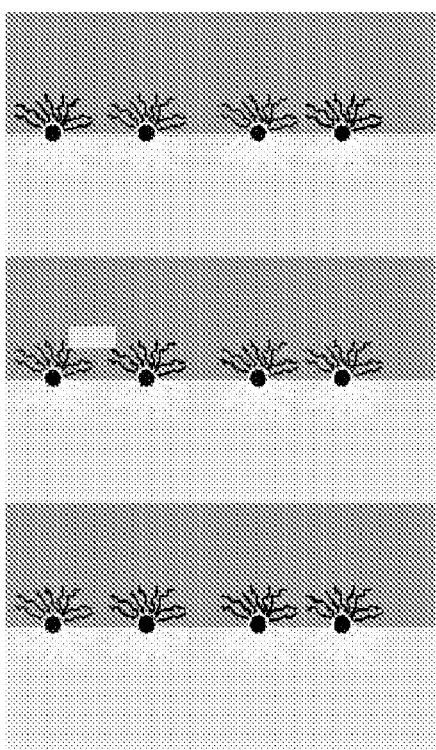
FIG. 21A
FIG. 21B
FIG. 21C

METAL-CONTAINING INORGANIC BLOCK COPOLYMERS

CROSS REFERENCE TO RELATED APPLICATIONS

Co-assigned U.S. patent application Ser. No. 11/265,990, filed Nov. 3, 2005, U.S. patent application Ser. No. 11/488,421, filed Jul. 18, 2006, and U.S. patent application Ser. No. 11/464,142, being filed simultaneously with the present application, are noted as related applications.

TECHNICAL FIELD

The present invention relates generally to inorganic block copolymers and related ceramic materials, and more particularly to inorganic block copolymers and related ceramic materials having metal species disposed therein.

BACKGROUND INFORMATION

The preparation of inorganic block-copolymers and pyrolysis thereof to obtain ceramics is described in co-assigned U.S. patent application Ser. Nos. 11/265,990 and 11/488,421, filed Nov. 3, 2005 and Jul. 18, 2006, respectively, the contents of both of which are incorporated herein by reference. For example, inorganic block copolymers may be synthesized via ring-opening metathesis polymerization (ROMP). Such inorganic block copolymers can self-assemble into structures having nano-scale order. This nanoscale order can be preserved upon the ceramization by pyrolysis. Thus for example, a self-assembled film of inorganic block copolymer composed of polynorbornene and polynorbornene-decaborane can be converted to ordered mesoporous boron nitride when pyrolysis is conducted in an ammonia atmosphere.

The articles of Chan et al., Chem. Mater., 1992, 4, 885-894; Chan et al., Organometallics 2003, 22, 3796-3808; and Berenbaum et al., Adv. Mater. 2003, 15, 51-55 are believed to represent relevant prior art.

BRIEF DESCRIPTION OF THE INVENTION

There is provided, in accordance with an embodiment of the invention, a block copolymer comprising at least two blocks wherein at least one block is inorganic-based and at least one metal-containing species is disposed in at least one of the blocks.

There is also provided, in accordance with another embodiment of the invention, a structured ceramic material having at least partly nano-ordered structure and in which at least one metal is disposed.

There is also provided, in accordance with another embodiment of the invention, a method for disposing a metal species in a collection of an inorganic block copolymer, the method comprising: (a) providing at least one entity selected from (i) a plurality of metal particles having an affinity for at least one block of the inorganic block copolymer and (ii) a plurality of an organometallic molecule that has an affinity for at least one block of the inorganic block copolymer; and (b) contacting the collection of copolymer with the at least one entity.

There is also provided, in accordance with an embodiment of the invention, a method for making an inorganic block copolymer having an organometallic moiety attached thereto, comprising: (a) covalently attaching an organometallic moiety to a first monomer; (b) polymerizing the first monomer to obtain a first polymer block; (c) polymerizing a second monomer to obtain a second polymer block; and (d) attaching the first and the second polymer blocks.

There is also provided, in accordance with another embodiment of the invention, a method for making a structured ceramic material having nano-ordered structure in at least a portion thereof and in which particles of at least one metal are disposed, comprising: (a) providing an inorganic block copolymer containing at least one inorganic-based segment; (b) providing a plurality of metallic particles that have an affinity for at least one block of said block copolymer, said metallic particles being selected from the group consisting of metal particles that have an affinity for at least one block of said block copolymer and metal particles coated with an agent that have an affinity for at least one block of said block copolymer; (c) contacting the copolymer with the metallic particles to obtain an inorganic block copolymer with metallic particles disposed therein; and (d) pyrolyzing the inorganic block copolymer with metallic particles disposed therein.

There is also provided, in accordance with another embodiment of the invention, a method for making a structured ceramic material having nano-ordered structure in at least a portion thereof and in which particles of at least one metal are disposed, comprising: (a) providing an inorganic block copolymer containing at least one inorganic-based block; (b) providing a plurality of an organometallic molecule that has an affinity for at least one block of the block copolymer; (c) contacting the copolymer with the plurality to obtain an inorganic block copolymer with organometallic molecules disposed therein; and (d) pyrolyzing the inorganic block copolymer with organometallic molecules disposed therein.

Additional embodiments and variations of embodiments of the invention will be described hereinafter.

BRIEF DESCRIPTION OF THE DRAWINGS

For a more complete understanding of embodiments of the present invention, reference will be made to the following descriptions taken in conjunction with the accompanying drawings, in which:

FIGS. 8A and 8B depict examples of $^{13}C$ nuclear magnetic resonance (NMR) spectra of polyethylene oxide (PEO), and PEO after reaction with CERASET®;

FIGS. 21A-21C show schematically examples of some ways in which a metal-containing species may be diposed in a di-block copolymer containing inorganic and organic blocks;

DETAILED DESCRIPTION OF THE INVENTION

Figure 1:
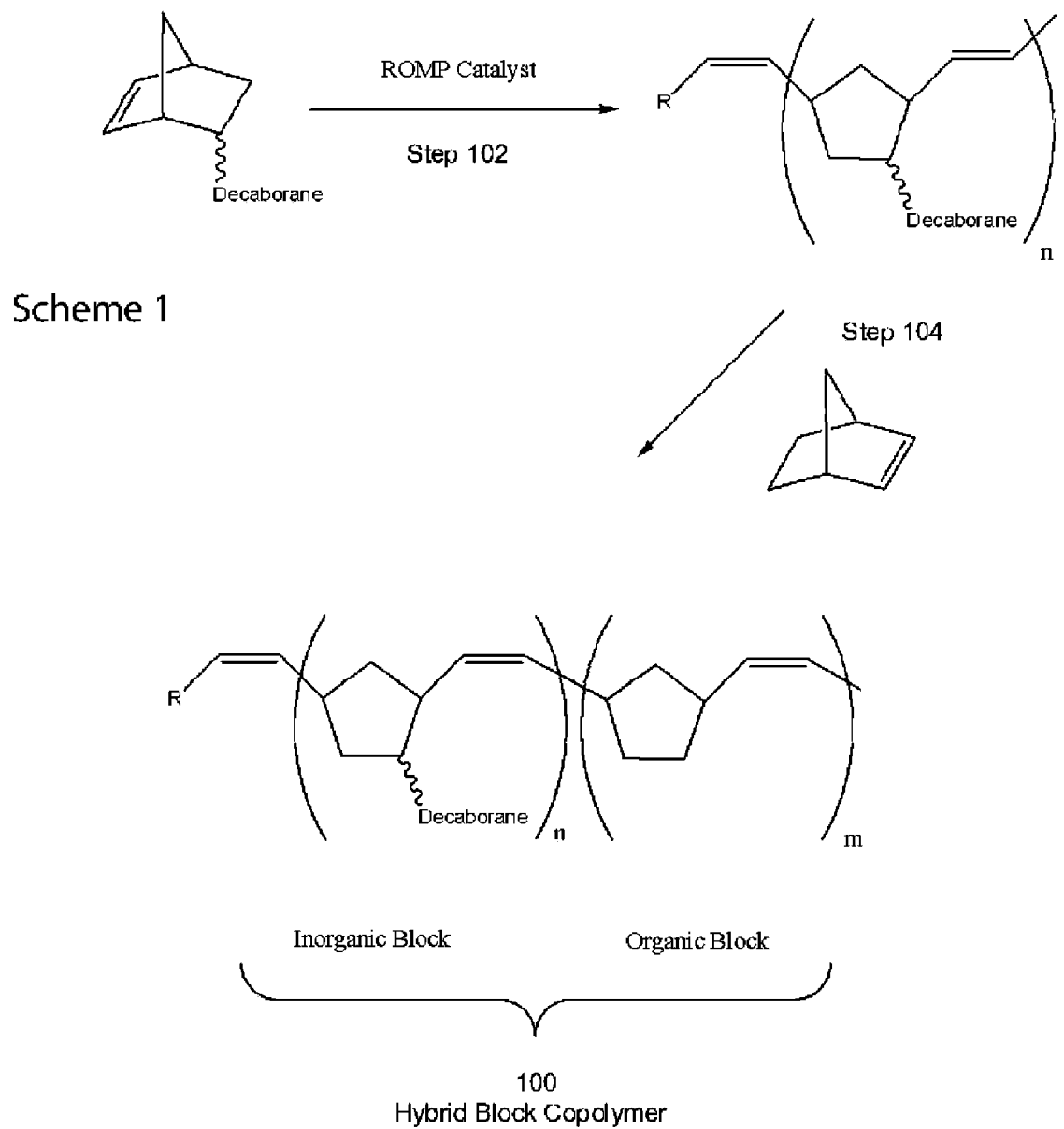
FIG. 1 (Scheme 1) depicts one example of the synthesis of a hybrid block copolymer by ROMP.

The present invention is generally directed to methods of making ceramics with nanoscale/microscale structure and which have one or more metal species disposed therein, involving self-assembly of precursor materials such as, but not limited to, inorganic-based block copolymers, including inorganic-/organic-based hybrid block copolymers, and other similar materials, and to the ceramic structures made by such methods. Where such precursor materials are themselves novel, the present invention is also generally directed to those materials and their synthesis.

Some embodiments of the present invention set forth methods of making nanoscale/microscale ceramic structures. Generically, such structures may be made by: (a) providing a quantity of ceramic precursor species (e.g., an inorganic-based block copolymer), the precursor species being molecular and comprising at least two segments that differ in their ability to segregate into at least two phases, wherein at least one of the at least two segments is inorganic-based; (b) allowing the quantity of precursor species to self-assemble into primary structures having dimensional attributes, i.e. a repeating unit size, in the range of from about 1 nm to about 100 μm; and (c) pyrolyzing the self-assembled primary structures to form secondary ceramic structures; wherein, at some point in the process, a metal-containing species is incorporated into the material, for example as a metal-containing moiety which is covalently attached to one of the blocks of the copolymer (either before or after polymerization) or non-covalently associated with (i.e. non-covalently bound to) one of the blocks of the polymer, or added to the ceramic after pyrolysis.

Generally speaking, such self-assembled primary structures and corresponding secondary structures comprise a morphology including, but not limited to, spherical, cylindrical, lamellae, gyroid, perforated lamellae, bicontinuous, and the like. Such structures can be ordered and/or disordered, and they can be part of a larger hierarchical structure that comprises dimensional attributes, i.e. a repeating unit size, ranging from the nanoscale to the macroscale.

The composition of the secondary structures is largely directed by the composition of the ceramic precursor species, but generally includes all ceramic compositions. Typical compositions include, but are not limited to, silicon carbide, silicon nitride, silicon carbonitride, silicon oxynitride, silicon boron carbonitride, boron nitride, boron carbide, boron carbonitride, silicon oxycarbide, and the like. The porosity of the secondary structure can also be controlled by the composition of the ceramic precursor species: species having a greater percentage of organic-based segments, for example, will likely lead to products with greater porosity upon pyrolysis. Such pyrolysis can be carried out in either an inert or reactive (e.g., reducing or oxidizing) atmosphere, and generally involves heating to temperatures in the range of from about 800° C. to about 2000° C. For example, ceramic precursors having decaborane as the precursor material may be pyrolyzed in argon to produce boron carbide, in nitrogen to produce boron carbonitride, or in ammonia to produce boron nitride (note that it should be understood that the use of ammonia does not preclude the presence of carbon in the boron nitride ceramic). Note that, in some embodiments, when desired, the secondary ceramic structure can be densified, for example, by an annealing process. Where such as-produced secondary ceramic structures possess a level of porosity, such densification can significantly reduce such porosity.

In some such above-described embodiments, the quantity of ceramic precursor species comprises block copolymer comprising at least two blocks, wherein at least one block is inorganic-based, such block copolymers being referred to herein as "inorganic-based block copolymers." In some embodiments, the metal-containing species is covalently attached to at least one of the blocks. Accordingly, where such ceramic precursor species are inorganic-based block copolymers that self-assemble into primary nano-/micro-structures that are polymer nano-/micro-structures, such polymer structures can be subsequently converted into ceramics with similar nano-/micro-structure via pyrolysis. A unique feature of such methods is that the inorganic components are integrated into the molecular structure of the block copolymer. With the inorganic components built-in, self-assembly of the inorganic block copolymer may be effected as a one component/one step operation.

In some such above-described inorganic-based block copolymers, all of the blocks are inorganic-based. In some other embodiments, such inorganic-based block copolymers comprise at least one organic-based block, such hybrid block copolymers alternatively being termed "inorganic-/organic-based hybrid block copolymers," or simply, "hybrid block copolymers." Suitable inorganic-based blocks for use in such block copolymers include, but are not limited to, polysilazane, polycarborane, polyureasilazane, polysilane, polycarbosilane, polyborazine, polyborazylene, polysiloxane, and the like. Other suitable inorganic-based blocks are derived from an organic-based polymer backbone comprising inorganic pendant groups, wherein the pendant groups provide for a ceramic structure upon self-assembly and pyrolysis. Suitable organic-based blocks for hybrid block copolymers include, but are not limited to, polybutadiene, polycyclooctadiene, polynorbornene, polyisoprene, polydimethylamino ethyl methacrylate, polyethylene oxide (PEO), polyvinylpyridine, polystyrene, polyhydroxystyrene, polyphenyleneoxide, polycarbonate, polyether-imide, polypropyleneoxide, polybutyleneteraphthalate, polyethyleneteraphthalate, and the like. Depending on the embodiment and desired product the block copolymer architecture can be selected from the group consisting of a di-block copolymer, a tri-block copolymer, multi-block copolymer, a dendritic-linear hybrid copolymer, star copolymer, and combinations thereof.

In some embodiments, the block copolymer has a polydispersity index in the range of about 1.0 to about 3.0. In some embodiments, especially where hybrid block copolymers are employed, the level of polydispersity is highly controllable. In some embodiments, where monodispersity of molecular weight prevails during synthesis, the self-assembled primary structure is well-ordered. Typically, as the level of polydispersity increases, the degree of order found in the self-assembled primary structure decreases.

In some embodiments, ceramic precursor additive is used in combination with inorganic-based block copolymer, collectively referred to as a precursor system, in the formation of primary and secondary structures. In some such embodiments, traditional organic-based block copolymers are also added.

Where such above-described ceramic precursor species are themselves novel, embodiments of the present invention are also directed to such novel species and methods for making same. In some such embodiments, the novel precursor species are novel inorganic-based block copolymers. More generally, however, such novel species can be any such ceramic precursor species that is molecular in composition and comprises at least two segments that differ in their ability to self-assemble by segregating into at least two phases, wherein at least one of the at least two segments is inorganic-based. Such novel inorganic-based precursor species are typically made via at least two successive reactions of a type including, but not limited to, anionic polymerization, cationic polymerization, free radical polymerization, ring opening metathesis polymerization, ring opening polymerization, condensation polymerization, metal-mediated polymerization, and combinations thereof. It will be appreciated that, for example, in a di-block copolymer, by covalently linking the metal-containing species to one of the blocks (either as part of the monomer or after polymerization), or by contacting the block copolymer, either before or after self-assembly, with metal particles that have been coated with a material having a greater affinity for one of the blocks or with organometallic molecules that have a greater affinity for one of the blocks, it is possible to obtain an assembled copolymer having the metal-containing species preferentially disposed in one of the blocks. FIGS. 21A-21C depict schematically how, in an a structure assembled from a collection of a block copolymer containing an organic and an inorganic block, in which the assembled structure has organic and inorganic domains formed from respective pluralities of organic and inorganic blocks, it is possible in principle to have the metal-containing species 2100 (e.g., coated particle) disposed preferentially in the inorganic 2102 (FIG. 21A) or the organic domain 2103, 2104 (FIG. 21B), or at the interface 2106 of the two domains (FIG. 21C). The former two situations may be achieved, for example, either through covalent linking of the metal-containing species to one of the blocks or through the use of coated metal particles having preferential affinity for one of the blocks. Location of the metal-containing species at the interface of two domains may be achieved, for example, through the use of organometallic molecules structured so that one side of the molecule has affinity for one block and the other side of the molecule has affinity for the other block, or by using particles that have been coated on one portion with a first coating having preferential affinity for one block and coated on another portion with a second coating having preferential affinity for the other block. After pyrolysis, the resulting ceramic will have cavities (pores or other shapes) where the organic blocks (domains) were present and the metal-containing species will be located either in the ceramic matrix, on the cavity surface, or at the outer edges of the ceramic matrix which define the cavities. It will also be appreciated that metal-containing species may be disposed in all blocks (or analogously by extension, domains of the assembled copolymer), either predominantly in one or more blocks (domains) or non-preferentially in all blocks (domains).

In some embodiments, when metal particles are used, during pyrolysis the metal particles may merge to form larger particles. In some embodiments, when organometallic molecules or moieties are used, during pyrolysis particles may form from the metal atoms in the organometallic molecules or moieties. In some embodiments, after pyrolysis, 2- or 3-dimensional metal structures may present in the ceramic, for example as a metal layer located between layers of ceramic, or having for example spherical, rod- or tube-like shapes that form in pores or cavities in the ceramic. In some embodiments, when the metal-containing species is disposed within an inorganic block of the block copolymer, during pyrolysis the metal may form covalent bonds with the inorganic component of the inorganic block. In some embodiments, more than one metal may be present during pyrolysis, so that particles or other 2- or 3-dimensional shapes containing two metals may be left after pyrolysis, or di-metal-inorganic materials (e.g. metal-metal nitrides) or di-metal-carbides may form as part of the ceramic.

It will be appreciated that ceramics formed in accordance with some embodiments of the invention have utility, for example, in heterogeneous catalysis.

As stated above, there is provided, in accordance with an embodiment of the invention, a block copolymer comprising at least two blocks wherein at least one block is inorganic-based and at least one metal-containing species is disposed in at least one of the blocks. In some embodiments, the block copolymer is in the form of an assembly of a collection of the block copolymer, wherein the assembly contains at least two domains, each of which is formed respectively from a different grouping of the blocks, and the at least one metal-containing species which is disposed in at least one of the blocks is disposed in a domain formed from a group which includes the block. Thus, for example, in the case of a di-block copolymer having blocks A and B, one domain may be formed from a plurality of blocks A (domain A) and another domain from a plurality of blocks B (domain B), and the metal-containing species may be disposed in domain A, domain B or both. In the case of a tri-block copolymer having domains A, B and C, for example, one domain may be formed from a plurality of blocks A (domain A), another domain from a plurality of blocks B (domain B), and another domain from a plurality of blocks C (domain C), and the metal-containing species may be disposed in domain A, domain B, domain C, or a combination thereof. Alternatively, for example, one domain may be formed from a plurality of blocks A (domain A), and another domain may be formed from a plurality of blocks B and blocks C (domain BC), and the metal-containing species may be disposed in domain A, domain BC, or both. In some embodiments, the at least one inorganic-based block is selected from the group consisting of polysilazane, polycarborane, polyureasilazane, polysilane, polycarbosilane, polyborazine, polyborazylene, polysiloxane, and combinations thereof In some embodiments of the invention, at least one block is organic-based. In some embodiments, the at least one organic-based block is selected from the group consisting of polybutadiene, polycycloctadiene, polynorbornene, polytetracyclododecene, polyisoprene, polydimethylamino ethyl methacrylate, polyethylene oxide, polyvinylpyridine, polystyrene, polyhydroxystyrene, polyphenyleneoxide, polycarbonate, polyetherimide, polypropyleneoxide, polybutyleneterephthalate, polyethyleneterephthalate, alkyl-substituted variations of these polymers, and combinations thereof By "alkyl substituted variation" is meant a polymer in which the constituent monomer has been modified by addition of an alkyl group. For example, polymethylnorbornene,

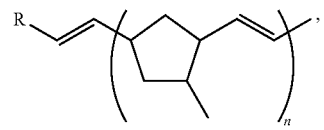

is an alkyl-substituted variation of polynorbornene,

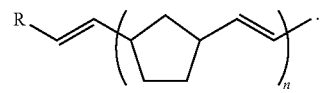

In some embodiments, the metal-containing species is in elemental form, that is, it is present as a substantially pure metal (e.g. as particles of gold or another metal) or a substantially pure mixture of 2 or more metals (for example as a mixture of particles of gold and silver, or particles composed of two or more metals which are not bound to each other, such as an alloy), in which the bulk metal may optionally be coated with a material that has a greater affinity for at least one of the blocks than for another of the blocks. Thus, in some embodiments, the metal-containing species is a single element, e.g. particles of gold, and in some embodiments, the metal-containing species contains a mixture or alloy of at least two metals, e.g. gold and silver. In some embodiments, the metal-containing species is present as coated metal particles, e.g. coated gold particles, coated for example with an alkylthiol or polyethylene oxide.

In some embodiments, the metal-containing species is in molecular form, that is, it is present as individual atoms or a small number of individual atoms (2 or 3) which are each covalently bonded to non-metal atoms as part of a molecule or molecular fragment. For example, the metal-containing species may be present as organometallic molecules, clusters or moieties, such as

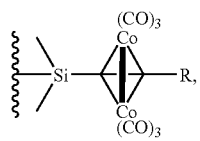

including metal-alkoxide molecules, e.g. titanium n-propoxide (Ti(OCH$_2$CH$_2$CH$_3$)$_4$). It will also be appreciated that in some embodiments, the metal-containing species contains a cluster of from two to twenty metal atoms which are covalently bound to each other and optionally to other non-metal atoms as well. The metal-containing species may also be present as an intermetallic species, i.e. a metallic species having atoms of two or more metals in defined ratios which are metallically bonded to each other, such as a gold-copper intermetallic species in which a defined proportion of gold atoms in elemental gold have been replaced with copper atoms (such as 3:1, 1:1 or 1:3 gold:copper ratio).

In some embodiments, the metal-containing species is present in molecular form as at least one organometallic molecule that is non-covalently associated with at least one of the blocks. In some embodiments, the organometallic molecule contains at least one metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn. In some embodiments, the metal in the organometallic molecule is selected from the group consisting of zirconium, titanium and molybdenum. In some embodiments, the organometallic molecule is zirconium C$_{1-6}$alkoxide, titanium C$_{1-6}$alkoxide or molybdenum C$_{1-6}$alkoxide. In some embodiments, at least one metal in the organometallic molecule is selected from the group consisting of Cr, W, Mn, Fe, Ru, Co, Rh, Ir, Ni, Pd, Pt, Cu, Ag and Au.

In some embodiments, the metal-containing species is present in molecular form as at least one organometallic moiety that is covalently attached to at least one of the blocks. In some embodiments, the organometallic moiety is selected from the group consisting of

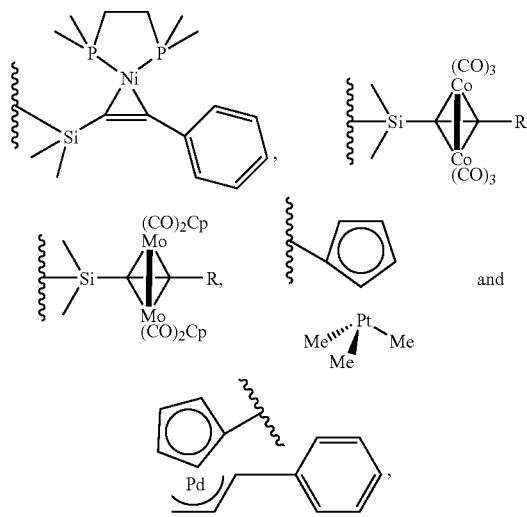

wherein R is phenyl or n-butyl and Cp is cyclopentadienyl anion.

In some embodiments, the metal-containing species is present in molecular form as part of an inorganic species that is non-covalently associated with at least one block. In some embodiments, the metal-containing species is present in molecular form as part of an inorganic species that is covalently attached to at least one block, the attachment having been formed after formation of the block by polymerization.

In some embodiments, the metal-containing species is present in molecular form and the metal-containing species contains a metal selected from Group 8, Group 9, Group 10, Group 11 and Group 12 as part of an inorganic species that is covalently attached to and forms a part of at least one of the blocks. In some embodiments, in which more than one metal-containing species may be present, one metal-containing species may be in elemental form and another metal-containing species may be in molecular form.

In some embodiments, the metal-containing species is selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn. In some embodiments, at least one metal in the metal-containing species is selected from the group consisting of gold, titanium, zirconium and molybdenum. In some embodiments, the metal-containing species is selected from the group consisting of Cr, Mo, W, Mn, Fe, Ru, Co, Rh, Ir, Ni, Pd, Pt, and Cu.

In some embodiments of the invention, the at least one metal-containing species is preferentially disposed within one of the blocks. In some embodiments, the at least one metal-containing species is preferentially disposed within the at least one inorganic-based block. In some embodiments, the at least one metal-containing species is preferentially disposed within an organic-based block. In other embodiments of the invention, the metallic species is disposed at the interface of two blocks.

In some embodiments of the invention, the block copolymer comprises at least one of the group consisting of polycarborane, polynorbornene and polynorbornene-decaborane.

In some embodiments of the invention, at least one block of the block copolymer comprises a polymerized monomer of norbornene having a pendant organometallic moiety. In some embodiments of the invention, at least one block of the block copolymer comprises a polymerized monomer of norbornene having a pendant inorganic moiety.

In some embodiments of the invention, a collection of the block copolymer is capable of self-assembling into a structure having dimensional attributes, i.e. a repeating unit size, in the range of from about 1 nm to about 100 μm.

In some embodiments of the invention, a collection of the block copolymer is assembled into at least one structure having dimensional attributes, i.e. a repeating unit size, in the range of from about 1 nm to about 100 μm. In some embodiments, the at least one structure displays at least one morphology selected from the group consisting of spherical, cylindrical, lamellae, gyroid, perforated lamellae, bicontinuous, and combinations thereof. In some embodiments, the at least one structure is selected from the group consisting of ordered structures, unordered structures, and combinations thereof, wherein "order" refers to periodicity over a length scale is at least 10 times the size scale of the unit structure. Thus, if a copolymer assembly has repeating domains of 10 nm width, the assembly will be said to be ordered if such repetition occurs over a length of at least 100 nm. Thus, for purposes of the present disclosure, a nano-ordered structure will be an ordered structure in which the size of the repeating unit is 0.5-500 nm.

In some embodiments of the invention, the block copolymer has an architecture selected from the group consisting of a di-block copolymer, a tri-block copolymer, multi-block copolymer, a dendritic-linear hybrid copolymer, star copolymer, and combinations thereof.

In some embodiments of the invention, the block copolymer has an average molecular weight in the range of about 1,000 to about 1,000,000. In some embodiments, the block copolymer has an average molecular weight in the range of about 1,000 to about 250,000. In some embodiments, the block copolymer has an average molecular weight in the range of about 1,000 to about 50,000.

In some embodiments of the invention, the block copolymer is made via at least two successive reactions of a type selected from the group consisting of anionic polymerization, cationic polymerization, free radical polymerization ring opening metathesis polymerization, ring opening polymerization, condensation polymerization, metal-mediated polymerization, and combinations thereof. In some embodiments, the block copolymer is made by a series of ring-opening metathesis polymerizations with different monomers.

In some embodiments of the invention, at least one of the at least one inorganic-based blocks is a ceramic precursor.

In some embodiments of the invention, the block copolymer has a polydispersity index in the range of about 1.0 to about 3.0. In some embodiments, the block copolymer has a polydispersity index in the range of about 1.0 to about 1.5. In some embodiments, the block copolymer has a polydispersity index in the range of about 1.0 to about 1.2.

As stated above, there is also provided, in accordance with embodiments of the invention, a structured ceramic material in which at least one metal is disposed and having at least partly nano-ordered structure, i.e. an ordered structure in which the size of the repeating unit is 0.5-500 nm.

In some embodiments of the invention, the structured ceramic material is porous in at least a portion thereof. In some embodiments, the at least one portion is mesoporous, i.e. it has pores ranging in size from about 2 nm to about 100 nm. In some embodiments, the average pore size is from about 0.5 nanometers to about 500 nanometers. In some embodiments, the average pore size is from about 0.5 nm to about 50 nm.

In some embodiments of the invention, the at least one metal is present in the ceramic as a plurality of particles of average diameter of from 0.5 to 500 nm. In some embodiments, the at least one metal is present as a plurality of particles of average diameter of from 0.5 to 50 nm. In some embodiments, the at least one metal is present as a plurality of particles of average diameter of from 0.5 to 5 nm.

In some embodiments of the invention, the at least one metal is selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn. In some embodiments, the at least one metal is selected from the group consisting of Au, Ti, Zr and Mo. In some embodiments, the at least one metal is selected from the group consisting of Cr, W, Mn, Fe, Ru, Co, Rh, Ir, Ni, Pd, Pt and Cu.

In some embodiments of the invention, the at least one metal is located primarily at the surface of walls of pores. In some embodiments of the invention, the at least one metal is located within the ceramic matrix.

In some embodiments of the invention, the ceramic is selected from the group consisting of nitride, carbide, oxide, carbonitride, oxynitride, oxycarbide, metal nitride, metal carbide, metal sulfide, metal oxide, metal phosphide, metal oxynitride, metal oxysulfide, metal oxyphosphide, metal boride, metal boron nitride, metal boron carbonitride, and mixtures thereof. In some embodiments, the ceramic is selected from the group consisting of nitride, carbide, oxide, carbonitride, oxynitride, oxycarbide and mixtures thereof. In some embodiments, the ceramic is boron nitride and the metal is gold. In some embodiments, the ceramic is boron nitride and the metal is molybdenum. It will also be appreciated that if, for example, a pendant organometallic group is prevalent in an assembled copolymer, and the copolymer is pyrolyzed in $NH_3$, metal nitride may be obtained as a prevalent component in the ceramic; whereas if the pendant organometallic group is present but in smaller amounts, pyrolysis under the same conditions will yield a ceramic having the metal nitride as a less prevalent component. It will also be appreciated that metal-metal nitrides and the like may be obtained, for example if pendant organometallic groups containing two different metals are employed and pyrolysis is conducted in an appropriate atmosphere.

In some embodiments, the ceramic is a composite of (a) one of the group consisting of nitride, carbide, oxide, carbonitride, oxynitride, oxycarbide, and mixtures thereof and (b) one of the group consisting of metal nitride, metal boride, metal carbide, metal oxide, metal sulfide, metal phosphide, metal carbonitride, metal oxynitride, metal boronitride, metal oxycarbide, metal oxyphosphide, metal oxysulfide, metal boron carbonitride, di-metal nitride, di-metal boride, di-metal carbide, di-metal oxide, di-metal sulfide, di-metal phosphide, di-metal carbonitride, di-metal oxynitride, di-metal boronitride, di-metal oxycarbide, di-metal oxyphosphide, di-metal oxysulfide, di-metal boron carbonitride and mixtures thereof In some embodiments, the metal is selected from the group consisting of Fe, Ru, Os, Co, Rh, Ir, Ni, Pd, Pt, Cu, Ag, Au and Zn. In some embodiments, the metal is zirconium or molybdenum. In some embodiments, the metal is titanium.

As stated above, there is also provided, in accordance with embodiments of the invention, a method for disposing a metal species in a collection of an inorganic block copolymer, the method comprising: a) providing at least one entity selected from (i) a plurality of metal particles coated with an agent that has an affinity for at least one block of the inorganic block copolymer and (ii) a plurality of an organometallic molecule that has an affinity for at least one block of the inorganic block copolymer; and b) contacting the copolymer with the at least one entity. In some embodiments, the method further comprises allowing the copolymers in the collection to self-assemble into an ordered structure prior to the contacting. In some embodiments, the method further comprises allowing the copolymers in the collection to self-assemble into an ordered structure after the contacting. In some embodiments, the at least one entity is selected from (i) a plurality of metal particles coated with an agent that has a greater affinity for at least one block of the inorganic block copolymer than do uncoated particles of the metal and (ii) a plurality of an organometallic molecule that has a greater affinity for at least one block of the inorganic block copolymer than for at least one other block of the inorganic block copolymer.

As stated above, there is also provided, in accordance with embodiments of the present invention, a method for making an inorganic block copolymer having an organometallic moiety attached thereto, comprising: (a) covalently attaching an organometallic moiety to a first monomer; (b) polymerizing the first monomer to obtain a first polymer block; (c) polymerizing a second monomer to obtain a second polymer block; (d) attaching the first and second polymer blocks. In some embodiments, the organometallic moiety is attached to the first monomer prior to the polymerization thereof In some embodiments, the organometallic moiety is attached to the first monomer after the polymerization thereof. In some embodiments, the first monomer is polymerized before the second monomer. In some embodiments, the attaching and polymerizing the second monomer are achieved concomitantly. In some embodiments, the polymerizing the second monomer occurs before the attaching. In some embodiments, the first monomer is polymerized after the second monomer. In some embodiments, the attaching and the polymerizing of the first monomer are achieved concomitantly. In some embodiments, the polymerizing the first monomer occurs before the attaching. In some embodiments, in both instances of polymerizing the polymerizing comprising ring-opening metathesis polymerization. In some embodiments, at least one of the first and second monomers is optionally substituted norbornene. Optional substituents include, e.g. organic groups (such as alkyl, alkoxy, heterocyclyl, aryl and heteroaryl), organometallic moieties (in addition to the organometallic moiety attached to the first monomer) and ceramic precursor moieties.

As mentioned above, there is also provided, in accordance with embodiments of the invention a method for making a structured ceramic material having nano-ordered structure in at least a portion thereof and in which particles of at least one metal are disposed, comprising: (a) providing an inorganic block copolymer containing at least one inorganic-based block; (b) providing a plurality of metallic particles that have an affinity for at least one block of said block copolymer, said metallic particles being selected from the group consisting of metal particles that have an affinity for at least one block of said block copolymer and metal particles coated with an agent that have an affinity for at least one block of said block copolymer; (c) contacting the copolymer with the metallic particles to obtain an inorganic block copolymer with metallic particles disposed therein; and (d) pyrolyzing the inorganic block copolymer with metallic particles disposed therein. In some embodiments, the metallic particles have a greater affinity for at least one block of the block copolymer than for at least one other block of the block copolymer.

As mentioned above, there is also provided, in accordance with an embodiment of the invention, a method for making a structured ceramic material having nano-ordered structure m at least a portion thereof and in which particles of at least one metal are disposed, comprising: (a) providing an inorganic block copolymer containing at least one inorganic-based block; (b) providing a plurality of an organometallic molecule that has an affinity for at least one block of the block copolymer; (c) contacting the copolymer with the plurality to obtain an inorganic block copolymer with organometallic molecules disposed therein; and (d) pyrolyzing the inorganic block copolymer with organometallic molecules disposed therein. In some embodiments, the organometallic molecule has a greater affinity for at least one block of the block copolymer than for at least one other block of the block copolymer.

As stated, some embodiments of the present invention are generally directed to methods of making ceramics with nanoscale/microscale structure having a metal disposed therein, involving self-assembly of precursor materials such as, but not limited to, inorganic-based block copolymers, including inorganic-/organic-based hybrid block copolymers, and other similar materials, and to the structures made by such methods. Where such precursor materials are themselves novel, embodiments of the present invention are also generally directed to those materials and their syntheses.

In some embodiments, such above-described inorganic-based block copolymers are made by a method comprising the steps of: (a) synthesizing a first polymer segment; (b) synthesizing a second polymer segment; and (c) attaching the second polymer segment to the first polymer segment so as to form an inorganic-based block copolymer comprising at least one inorganic-based block, wherein such attaching involves covalent bond formation and is carried out in a manner selected from the group consisting of: in situ attachment during the formation of the second polymer segment, by growing the second polymer segment from the first polymer segment attachment after synthesizing the second polymer segment, and combinations thereof; and wherein a metal-containing species is incorporated into the inorganic block copolymer at some point in its production.

While most of the terms used herein will be recognizable to those of skill in the art, the following definitions are nevertheless put forth to aid in the understanding of the present invention. It should be understood, however, that when not explicitly defined, terms should be interpreted as adopting a meaning presently accepted by those of skill in the art.

Although the term "block copolymer" conventionally has been applied to purely organic structures, the term "block copolymer" as used herein applies more broadly to include structures comprising at least two blocks, regardless of whether those blocks are organic-based or inorganic-based. Generally, such blocks are polymeric and such block copolymers capable of self-assembly. While in some embodiments such blocks are polymeric segments comprising identical mers, in other embodiments such blocks comprise random or alternating arrangements of different mers, e.g., one block could be a mixture of two or more different monomers. Generally, blocks are differentiated by their ability to phase segregate.

"Nanoscale," as defined herein, refers to a size regime that ranges from about 0.5 nm to about 500 nm. Something is "nanostructured" if it has nanoscale dimensional attributes, i.e. a nanoscale repeating unit size.

"Microscale," as defined herein, refers to a size regime in the range of from about 500 nm to about 100 µm. Something is "microstructured" if it has microscale dimensional attributes, i.e. a microscale repeating unit size.

Many of the structures described herein are "hierarchical" and can comprise structural elements on the nano-, micro-, and/or larger scales.

"Inorganic-based, " as defined herein, refers to molecular (e.g., polymer) segments comprising elemental constituents suitable for forming ceramic structures upon pyrolysis. Such elemental constituents include, but are not limited to, Si, C, N, B, O, and the like, and combinations thereof The term "inorganic block copolymer" refers to a copolymer having at least one inorganic-based block. An "inorganic species" refers to a molecule or molecular fragment that is formed predominantly from atoms other than carbon.

"Organic-based," as defined herein, refers to molecular (e.g., polymer) segments primarily carbon and having an elemental composition that is generally insufficient for forming ceramic structures upon pyrolysis.

"Organometallic molecule" refers to a molecule that is primarily carbon-based, but contains at least one metal atom and optionally a minority of other non-carbon atoms. An "organometallic moiety" refers to a fragment of an organometallic molecule that retains its organometallic character.

"Polymeric," as defined herein, generally refers to 1-dimensional connectivity in a molecular species comprising a quantity of "mers" that typically number at least about 4, wherein a "mer" is also referred to as a "monomeric building block."

"Polydispersity," as defined herein, refers to molecular weight distribution for a given polymer and is generally quantified via a "polydispersity index," where said index is defined as a ratio of weight average molecular weight to number average molecular weight.

"Self-assembly," as defined herein, refers to a propensity to self-organize (self-assemble) into a structured arrangement.

"Pyrolysis," as defined herein, is the heating of the self-assembled primary structure in either an inert or reactive environment, so as to ceramize the structure and form a secondary ceramic structure. "Mesoporous" refers to structures having pores in the range of 2-100 nm diameter. "Order" refers to periodicity over a length scale is at least 10 times the size scale of the unit structure. Thus, for example, a nano-ordered structure will be an ordered structure in which the size of the repeating unit is 0.5-500 nm.

The statement that a metal-containing species is disposed in a block of a copolymer means that, if the block has two-dimensional structure, the metal-containing species is covalently attached and/or non-covalently associated to the surface of the block and if the block has three-dimensional structure, the metal-containing species is (a) covalently attached and/or non-covalently associated to the surface of the block and/or (b) dispersed (not necessarily homogeneously) through the thickness of the block, which may or may not include being covalently attached and/or non-covalently associated to the interior of the block. It will be understood that throughout the present description, reference to a metal-containing species being disposed in a block includes the situation in which a collection of a block copolymer has assembled into a assembly, i.e. a structure, having domains formed from pluralities of blocks, and the metal-containing species is disposed within a domain formed from a plurality of the referred-to block The following examples are included to demonstrate particular embodiments of the present invention. Examples 1-13 illustrate in general some methods for making inorganic block copolymers and related ceramics. On the basis of the previous and subsequent description, it will be appreciated by people skilled in the art how these methods can be adapted to incorporate metal-containing species into the copolymers and/or ceramics, in accordance with embodiments of the invention. Examples 14-20 illustrate some methods for making block copolymers and associated ceramics having metal-containing species disposed therein, in accordance with embodiments of the invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

Synthesis of a Hybrid Block Copolymer by ROMP

Referring to FIG. 1, the synthesis described in Scheme 1 to form a hybrid block copolymer 100 involves the polymerization of a norbornene derivative having decaborane as a pendant functional group. See Step 102. This monomer can be polymerized using common ROMP catalysts such as those described in Choi et al., Angew. Chem. Int Ed. 2003, 42, 1743-1746 and Wei et al., Organometallics, 2004, 23, 163-165, the contents of both of which are incorporated herein by reference. As described in Wei et al., the polymerization of decaborane functionalized norbornene can be effected by employing Generation 1 or 2 Grubbs catalysts. According to Choi et. al., a second block can be prepared from the first by simply adding a second monomer, in this case norbornene, to the reaction mixture once the decaborane functionalized monomer has been consumed. See Step 104. This reaction can be carried out in a single pot, the order of the monomers may be reversed, and subsequent termination and isolation can be done using common techniques familiar to those skilled in the art so as to form an inorganic-based block copolymer capable of forming boron carbide upon ceramization. A variation on this Example includes substitution of the norbornene in Step 102 with a functionalized norbornene or cyclooctene derivative or other functionalized monomer susceptible to ROMP.

EXAMPLE 2

Figure 2A:
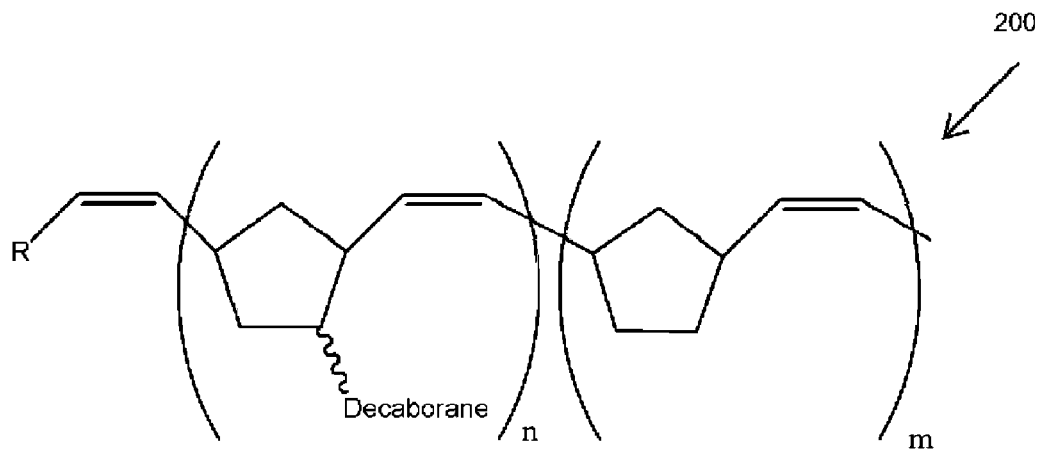
FIGS. 2A and 2B depict examples of ROMP-prepared hybrid block copolymer (A), as well as a suitable ceramic precursor additive (B) that can be used with the block copolymer in preparing primary/secondary structures.

ROMP-Prepared Hybrid Block Copolymer and a Suitable Ceramic Precursor Additive Used with the Block Copolymer in Preparing Primary/Secondary Structures The above-mentioned hybrid block copolymer 200 is shown in FIG. 2A and was prepared as described in Example 1. Its combination with a modified Starfire polymer (MSFP), which is a silicon carbide (SiC) precursor, is anticipated to provide a phase segregated structure in which the hybrid block copolymer is used as a template and the polynorbornene (organic-based block) serves as the domain that will be swollen with MSFP. Upon pyrolysis, the resulting ceramic material is anticipated to have nanoscale domains comprising boron carbide and silicon carbide.

Figure 2B:
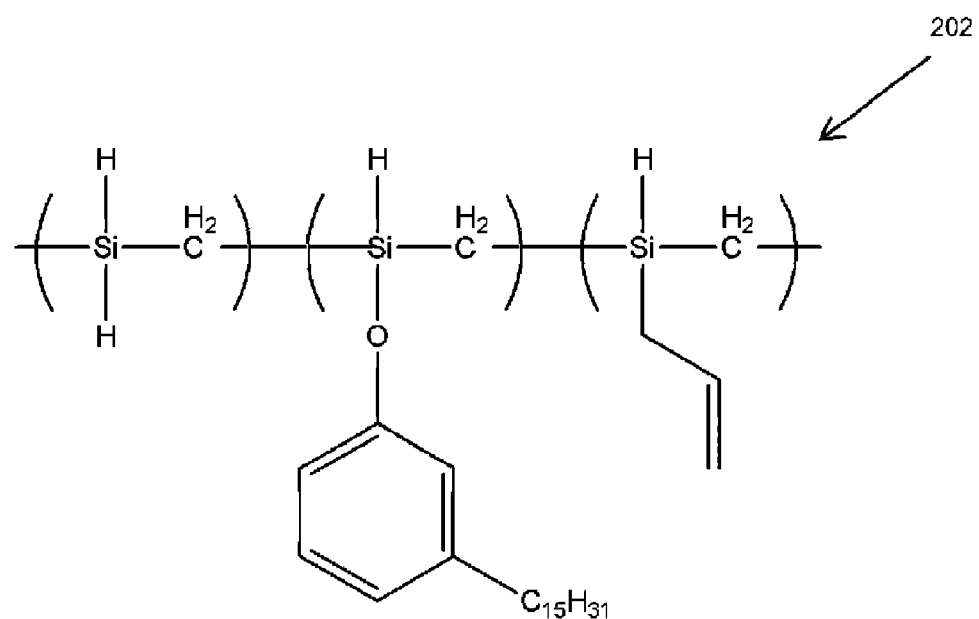

The above-mentioned ceramic precursor additive 202 is shown in FIG. 2B. The ceramic precursor MSFP results from the Lewis acid-mediated reaction between 2-pentadecyl-phenol and polycarbosilane. The carbosilane is a commercially available material manufactured by Starfire Systems (NY).

EXAMPLE 3

Synthesis of a Hybrid Block Copolymer

Figure 3:
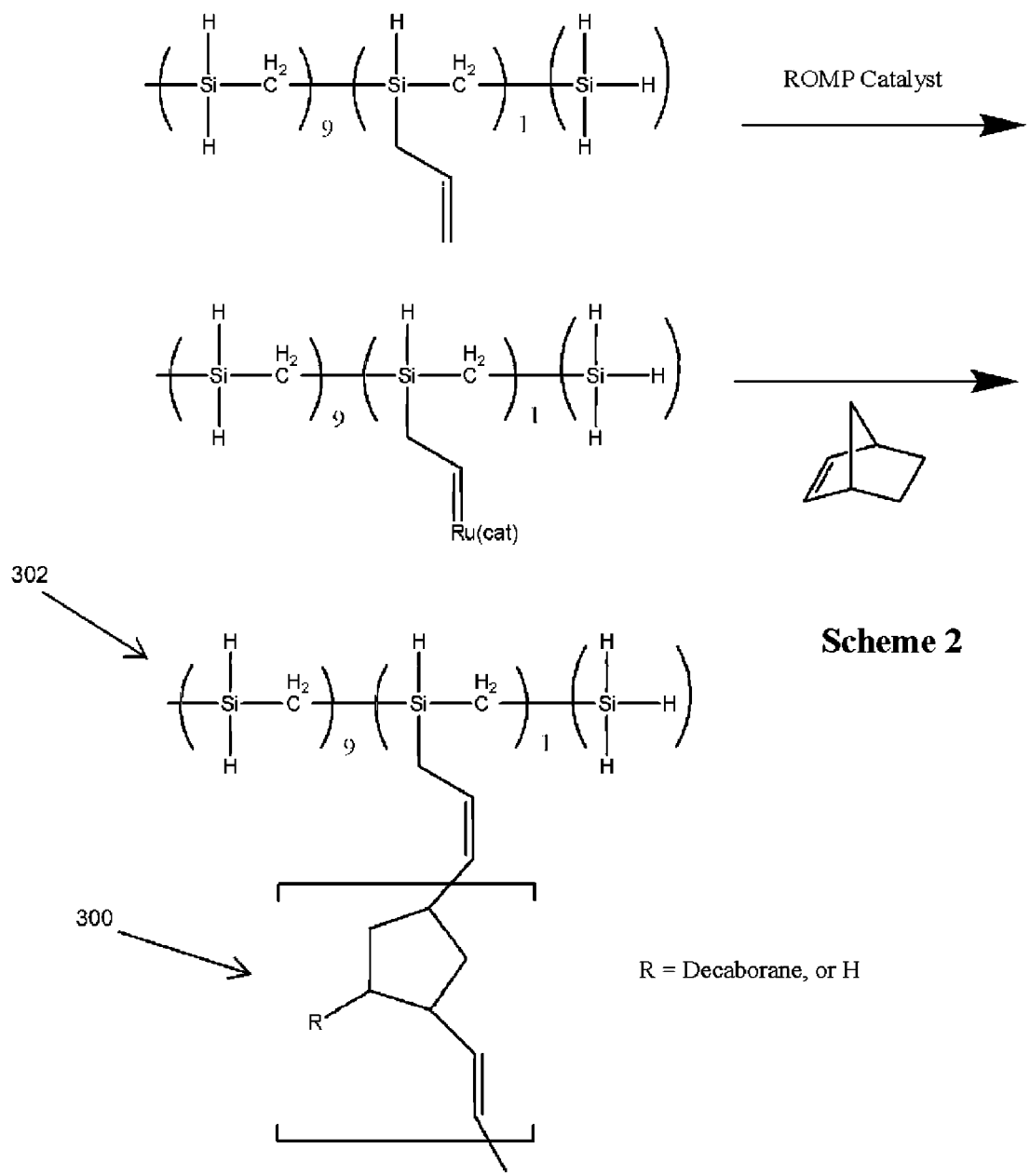
FIG. 3 (Scheme 2) depicts, when R=H, one example of the synthesis of a hybrid block copolymer, and, when R=decaborane, one example of the synthesis of an inorganic-based block copolymer that is entirely inorganic-based.

Referring to FIG. 3, Scheme 2 describes the synthesis of a polymer 300 grafted to a carbosilane precursor 302, where R=H. The ROMP catalyst must be appended to the carbosilane in such a way that it remains active towards ROMP. This may be done, for example, by directly appending the catalyst via allyl silane functionalities (shown) or via an alternative olefin-based moiety that has been affixed to the carbosilane backbone (not shown). Subsequent introduction of a suitable monomer, such as norbornene, can provide a star polymer with a carbosilane core and polynorbornene arms. This provides a modified carbosilane that is designed to target carbon-rich organic blocks such polynorbornene, polycyclooctadiene, or polybutadiene.

EXAMPLE 4

Synthesis of an Inorganic-Based Block-Copolymer that is Completely Inorganic-Based Referring to FIG. 3, Scheme 2 describes the synthesis of polymer 300 grafted to a carbosilane precursor 302, where R=decaborane. The ROMP catalyst must be appended to the carbosilane in such a way that it remains active towards ROMP. This may be done, for example, by directly appending the catalyst via allyl silane functionalities (shown) or via an alternative olefin based moiety that has been affixed to the carbosilane backbone (not shown). Subsequent introduction of a suitable monomer, such as norbornene, should provide a star polymer with a carbosilanes core and polynorbornene arms. This provides an inorganic-based block copolymer with a star-like architecture that would yield a nano structure having SiC domains and boron carbide domains if pyrolysed in an inert atmosphere.

EXAMPLE 5

A Precursor System Comprising an Organic-Based Block Copolymer, a Hybrid Block Copolymer, and a Ceramic Precursor Additive This Example illustrates a precursor system comprising an organic-based block copolymer, a hybrid block copolymer, and a ceramic precursor additive. ROMP can be initiated from the chain end of an existing polymer such as polyethylene oxide (PEO), as described in Castle et al., Macromolecules, 2004,37(6), 2035-2040, the contents of which are incorporated herein by reference. In this Example, PEO is used as a macro-initiator for ROMP. Under modified conditions, the PEO segment may also be incorporated into a block copolymer architecture by functioning as a chain transfer agent.

Figure 4A:
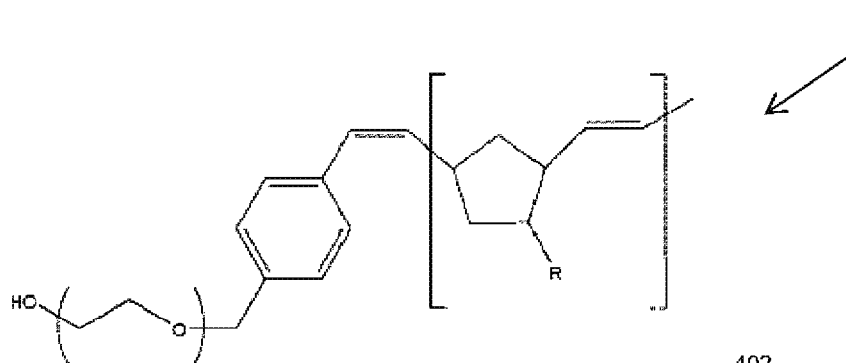
FIGS. 4A-4C depict examples of a ceramic precursor system comprising an organic-based block copolymer (4A), a ceramic precursor additive (4B), and a hybrid block copolymer (4C)
Figure 4B:
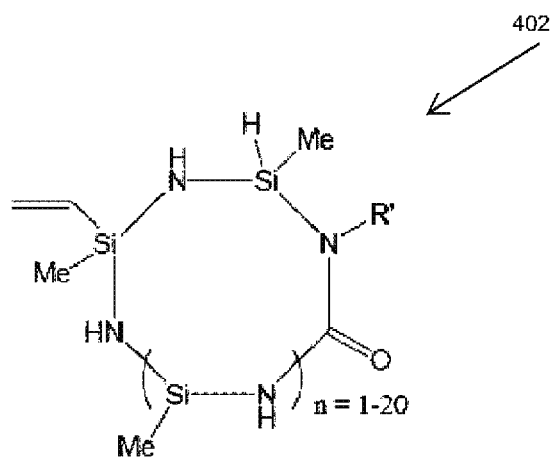
Figure 4C:
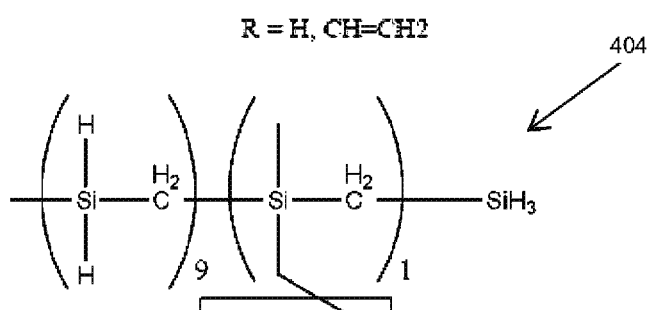

Referring to FIG. 4, in this system FIG. 4A is an organic-based block copolymer 400 in which R=H. FIG. 4B ceramic precursor additive 402 is phase targeted towards the PEO domains, while the hybrid block copolymer 404 (R=H) depicted in FIG. 4C is expected to be targeted towards the polynorbornene domains found in organic-based block copolymer 400. The resulting material is a nanostructured SiC—SiCN. In cases were R=decaborane, the resulting nanostructured product could be SiCN—SiCB.

EXAMPLE 6

Figure 5A:
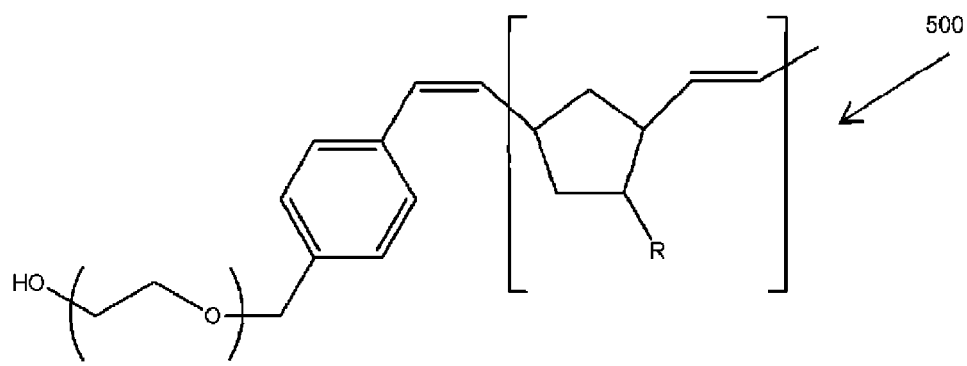
FIGS. 5A and 5B depict examples of an organic-based block copolymer (A) for use in the ceramic precursor system comprising CERASET®, as described in EXAMPLE 6.
Figure 5B:
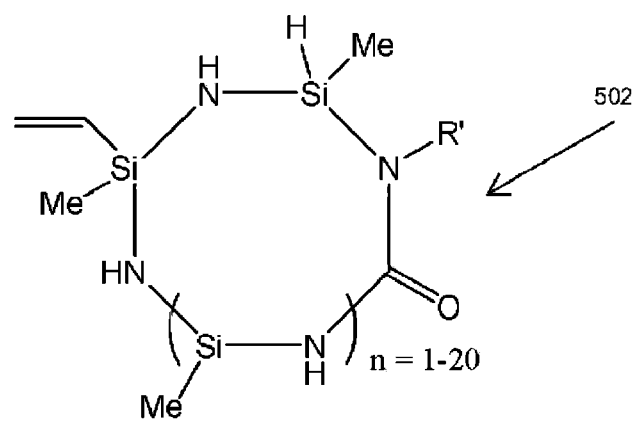

A Precursor System Comprising a Hybrid Block Copolymer and a Ceramic Precursor Additive CERASET® is added to the structure depicted in FIG. 5. In this system, FIG. 5A shows an organic-based block copolymer 500 in which R=H. The ceramic precursor additive 502 of FIG. 5B is phase targeted towards the PEO domains. The material resulting after pyrolysis is a nano structured BC—SiCN ceramic if R=decaborane and the processing atmosphere is inert. In cases where R=decaborane and the processing atmosphere is ammonia, the resulting nanostructured product could be SiCN—BN.

EXAMPLE 7

Figure 6:
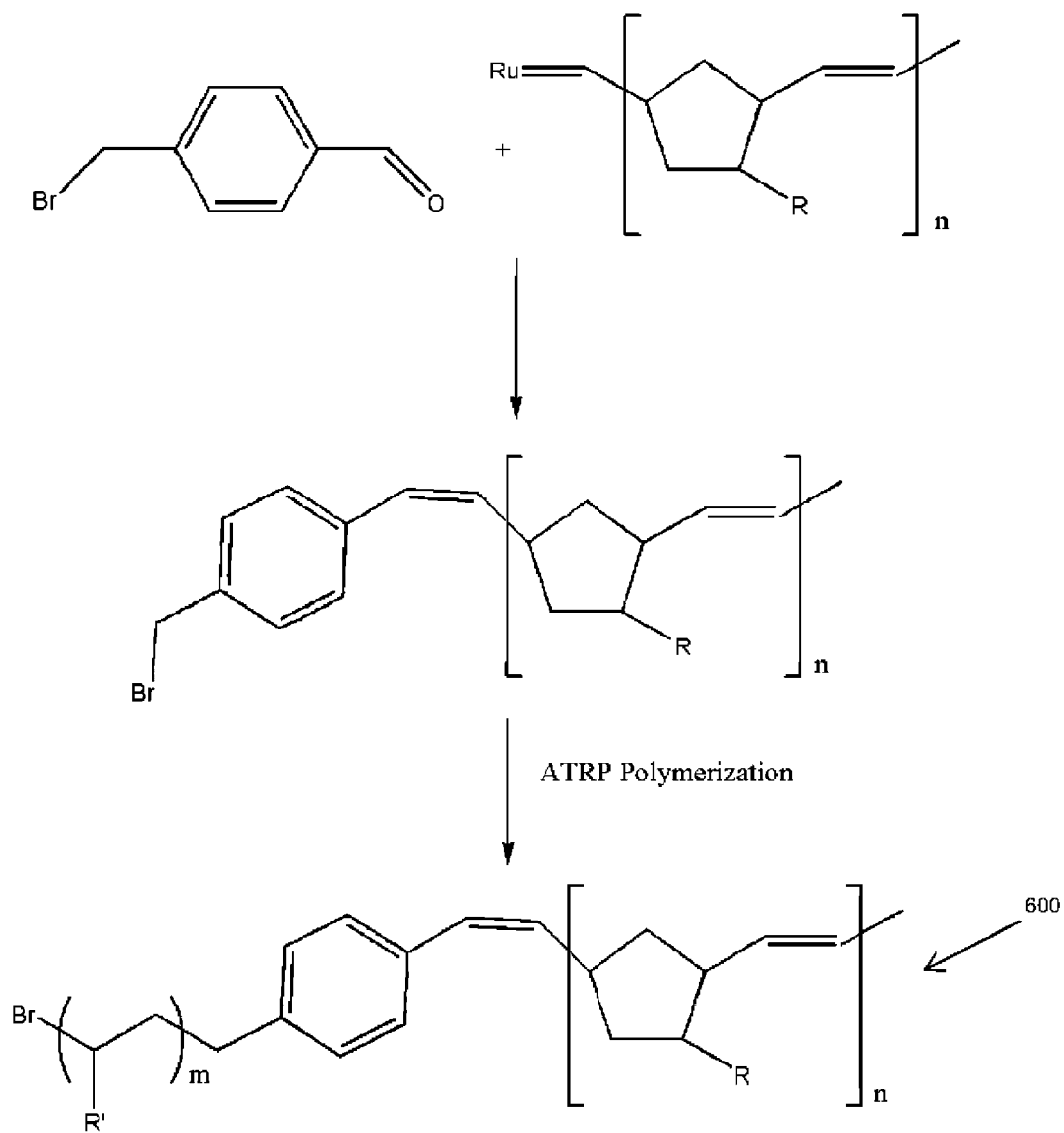
FIG. 6 (Scheme 3) depicts one example of the synthesis of a hybrid block copolymer by living free radical polymerization and ROMP.

Synthesis of a Hybrid Block Copolymer by Living Free Radical Polymerization and ROMP In this Example, a suitable initiating species is selected based on its ability to initiate both living free radical polymerizations via atom transfer radical polymerization (ATRP) as well as ROMP. Scheme 3 (FIG. 6) depicts how a living polymer synthesized using ROMP can be chain-end functionalized with 4-bromomethylbenzaldehyde to provide a polymer 600 having a benzyl bromide chain end. This moiety can subsequently be used to synthesize a second block using a suitable vinyl monomer. In the case where R=decaborane, a hybrid block copolymer results. R' may be chosen such that the block made by ATRP can accommodate another ceramic precursor. For instance, where R'=PEO or polydimethylamino ethyl methacrylate, ceramic precursors such as CERASET® could be incorporated.

EXAMPLE 8

In situ Tri-Block Formation of a Hybrid Block Copolymer

Figure 7:
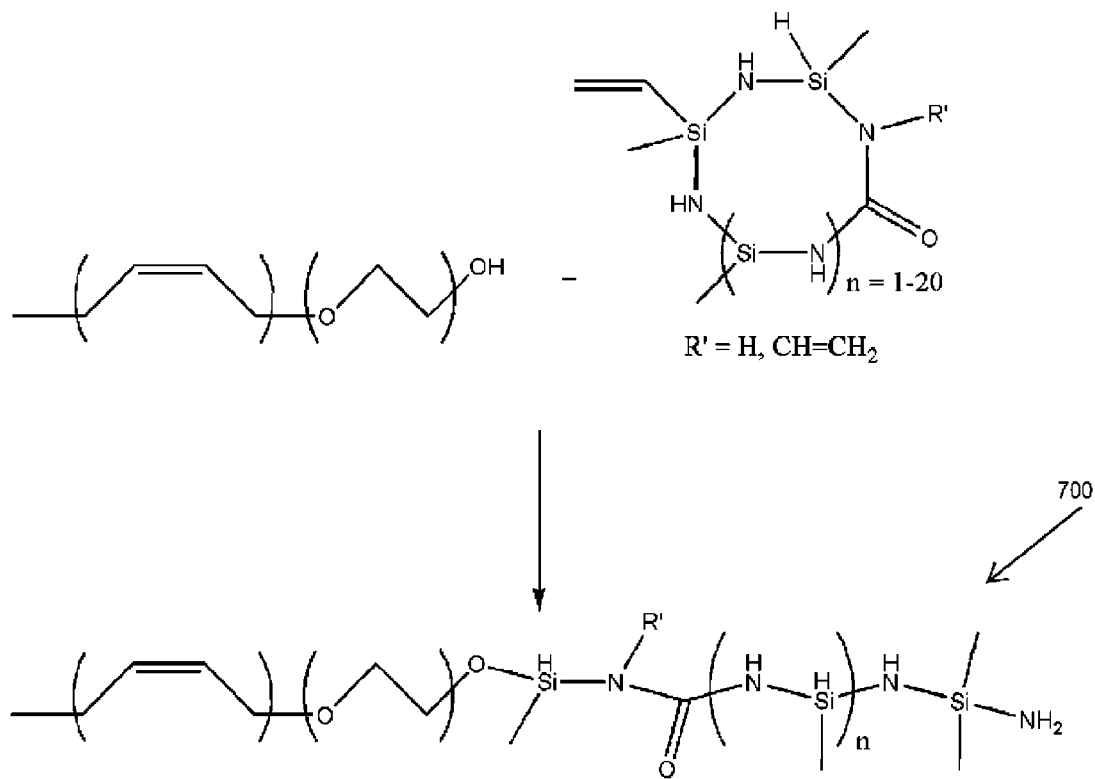
FIG. 7 (Scheme 4) depicts one example of the in situ tri-block formation of a hybrid block copolymer.
Figure 8B:
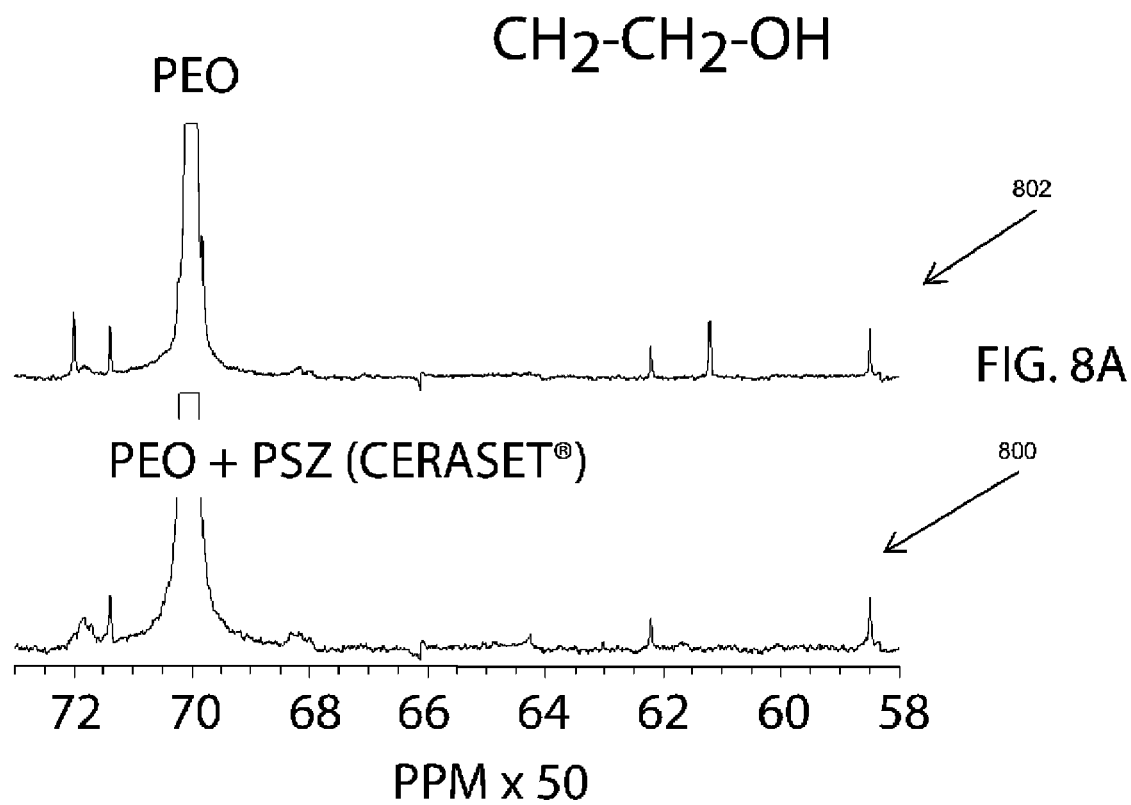

Referring to FIG. 7, Scheme 4 schematically illustrates the synthesis of a triblock copolymer 700 in which one of the blocks is a ceramic precursor. In this particular example, CERASET® reacts with the hydroxyl chain end of the PEO block to yield a Si—O linkage between CERASET® and the block copolymer, which is enthalpically favored. This occurs in situ during the assembly of the block copolymer in the presence of CERASET®. Referring to FIG. 8, evidence for the reaction can be seen in the $^{13}$C nuclear magnetic resonance (NMR) spectrum of the product (800, FIG. 8B) that results from reacting hydroxyl-terminated PEO (802, FIG. 8A) with CERASET® (polyureasilazane). It can be clearly seen in FIG. 8 that the peak shifts for the terminal ethylene group change upon functionalization. Furthermore, capping of the terminal hydroxyl group prevents any reaction from occurring with CERASET®, and Applicants have observed that this can severely hinder the incorporation of CERASET® into the PEO domain, as well as preclude the formation of an ordered structure.

EXAMPLE 9

Synthesis, Self-Assembly and Pyrolysis of a Polynorbornene-Block-Polynorbornenedecaborane Copolymer This Example illustrates the synthesis by ROMP of a polynorbornene-block -polynorbornenedecaborane copolymer 900 (FIG. 9) containing 15 mol % polynorbornene-decaborane, the subsequent self-assembly of the block copolymer into an ordered structure comprising lamellar and perforated lamellar structures, and the further pyrolysis of the self-assembled block copolymer into a nano-ordered ceramic comprising lamellar and perforated lamellar structures.

Figure 9:
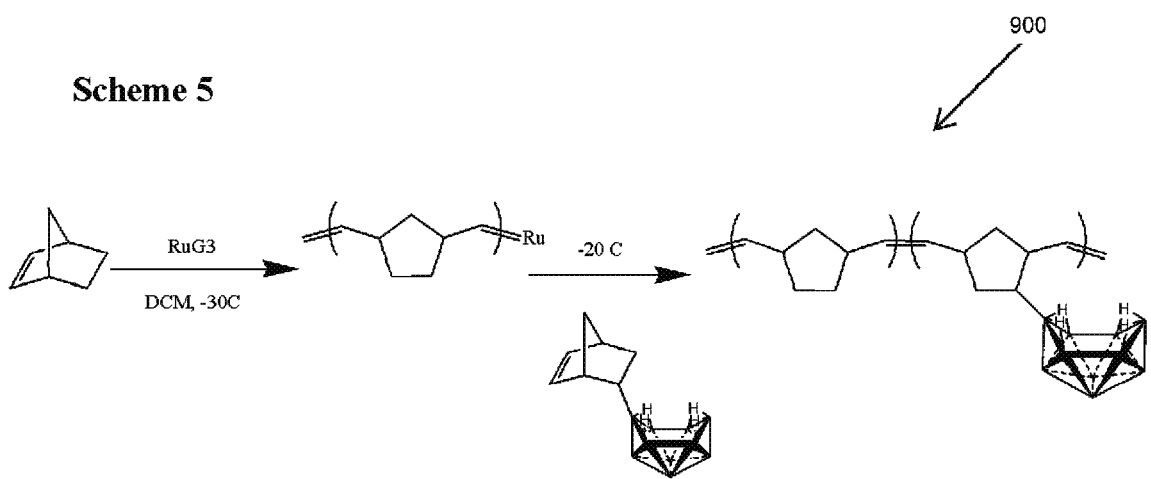
FIG. 9 (Scheme 5) depicts one example of the synthesis of a polynorbornene-block-polynorbornenedecaborane copolymer by ROMP.

A solution of norbornene (1.0 g in 50 mL CH$_2$Cl$_2$, (DCM)) was cooled to −30° C. using a Dry Ice-acetone bath for 15 min. To this solution was added a 5 mL solution containing 80 mg of Grubb's Generation 3 (GG3) catalyst (see Choi et al., Angew. Chem. Int Ed. 2003, 42, 1743-1746) and the solution was stirred at −30° C. for 30 min. A solution of norbornene-decaborane (0.85 g in 10 mL DCM) was subsequently added to the reaction mixture. The reaction bath temperature was maintained at −20° C. for 15 min. The reaction was quenched with 2 mL of ethyl vinyl ether while stirring for 5 min. The reaction solution was added dropwise to 400 mL of pentane. Most of the pentane was decanted and the polymer was re-dissolved in DCM. The polymer was filtered through silica using DCM as the eluant. The collected polymer was dried in vacuo, re-dissolved in tetrahydrofuran (TBF) and precipitated into 600 mL of pentane. The total yield after drying was 1.40 g. The synthesis reaction is shown in Scheme 5 (FIG. 9). Decaborane mol % content in the block copolymer was assessed by proton nuclear magnetic resonance ($^1$H NMR).

Figure 10:
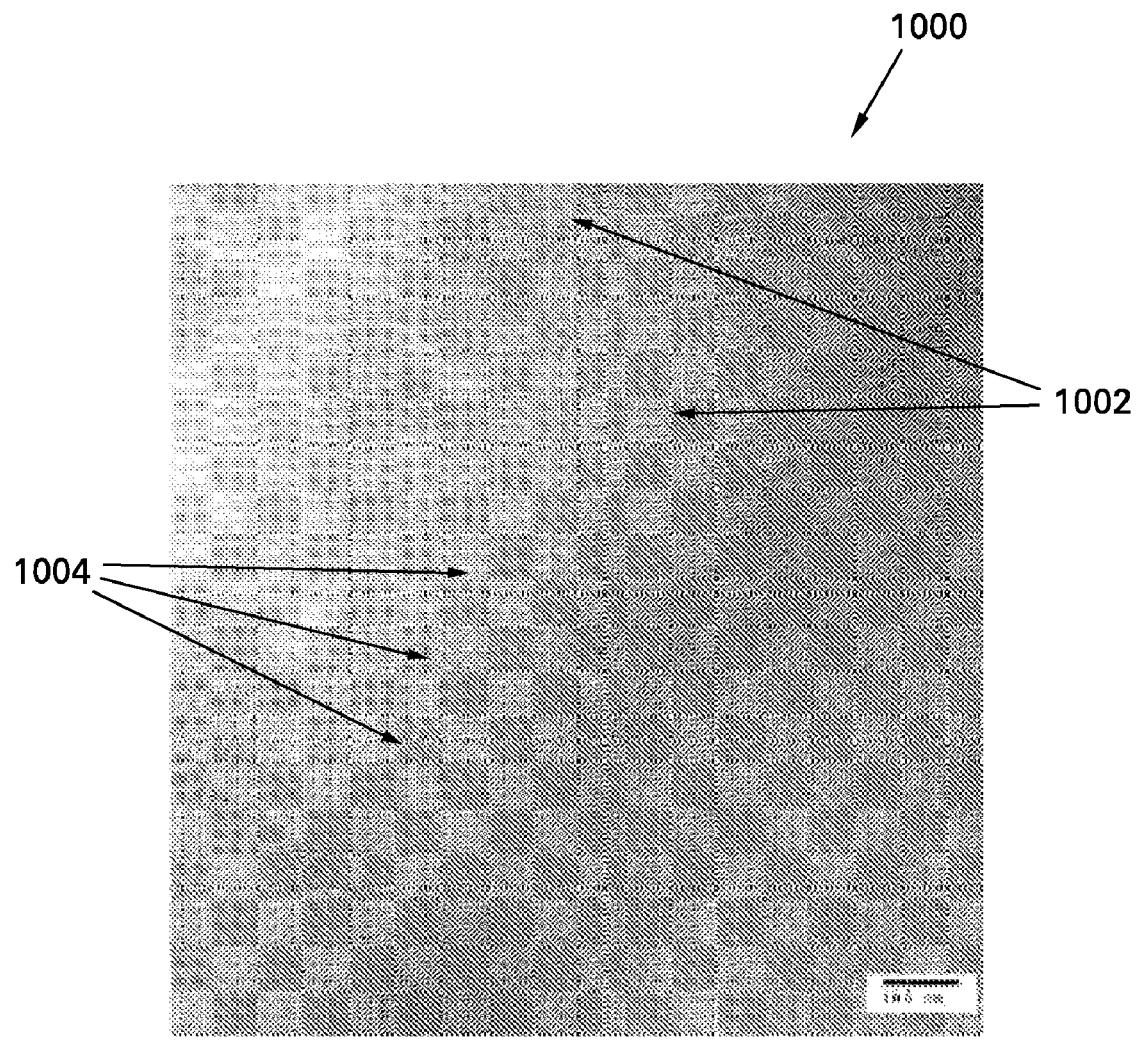
FIG. 10 is a transmission electron microscope (TEM) image of one example of self-assembled polynorbornene-block-polynorbornenedecaborane copolymer containing 15 mol % norbornenedecaborane, where region(s) 1002 is representative of the dominant lamellar morphology and region(s) 1004 is representative of perforated lamellar morphology.

The block copolymer was dissolved in chloroform (CHCl$_3$) and the solvent was allowed to evaporate under an inert atmosphere. The resulting film was then subjected to thermal annealing at 100° C. for 24 hours in a nitrogen atmosphere. FIG. 10 is a transmission electron microscopy (TEM) bright field image 1000 of the self-assembled polymer, showing nanoscale-ordered structure dominated by lamellar morphology (e.g., regions 1002). In certain locations, perforation of lamellae can be observed (e.g., regions 1004).

Figure 11:
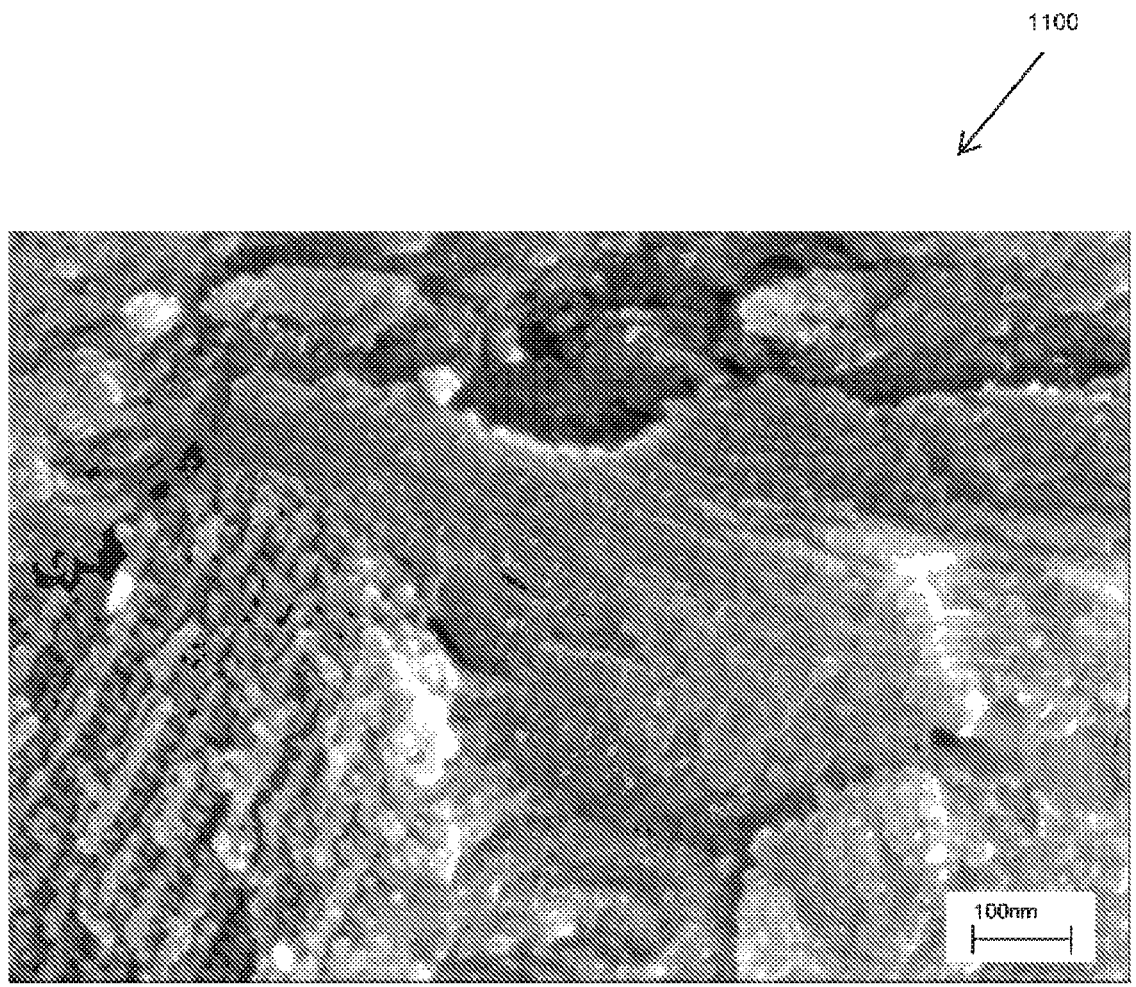
FIG. 11 is a scanning electron microscope (SEM) image of one example of a pyrolyzed ceramic structure from polynorbornene-block-polynorbornenedecaborane copolymer containing 15 mol % norbornenedecaborane, wherein the image depicts lamellar structure mixed with perforated lamellar structure.

The sample was subsequently transferred to a tube furnace where it was heated in a nitrogen atmosphere. The pyrolysis process involved heating the sample from room temperature to 400° C. at 5° C./min followed by a dwell time of 1 hour at 400° C. A subsequent ramp cycle was then used to bring the sample to 1000° C. (1° C./min). The sample was held at 1000° C. for 4 hours. The structure of the pyrolyzed ceramics is shown in the scanning electron microscopy (SEM) image 1100 of FIG. 11. It can be seen from the figure that the pyrolyzed ceramics retained the morphology of the self-assembled polymer, which is a lamellar structure with regions of perforated lamellar structures.

EXAMPLE 10

Synthesis, Self-Assembly and Pyrolysis of a Polynorbornene-Block-Polynorbornenedecaborane Copolymer This Example illustrates the synthesis by ROMP of a polynorbornene-block -polynorbornenedecaborane copolymer containing 30 mol % polynorbornenedeca-borane, subsequent self-assembly of the block copolymer via solvent evaporation into lamellar ordered structure, and further pyrolysis of the self-assembled block copolymer into a lamellar nano-ordered ceramic.

A solution of norbornene (0.5 g in 75 mL DCM) was freeze-pump thawed 3 times. To this solution was added a 3 mL solution containing 40 mg of GG3 catalyst that had been freeze-pump thawed twice. Both solutions were chilled to −25° C. prior to mixing. The resulting mixture was stirred for 30 min. at −30° C. A solution of norbornene-decaborane (0.5 g in 10 mL DCM) was freeze-pump thawed 3 times and added to the reaction mixture. After 25 min., the reaction was quenched with 10 drops of ethyl vinyl ether. The reaction was directly precipitated from pentane and the white precipitate was filtered using a Buchner filter with filter paper. The polymer was dried overnight at room temperature providing 0.81 g of product. Decaborane mol % content in the block copolymer was assessed by proton nuclear magnetic resonance.

Figure 12A:
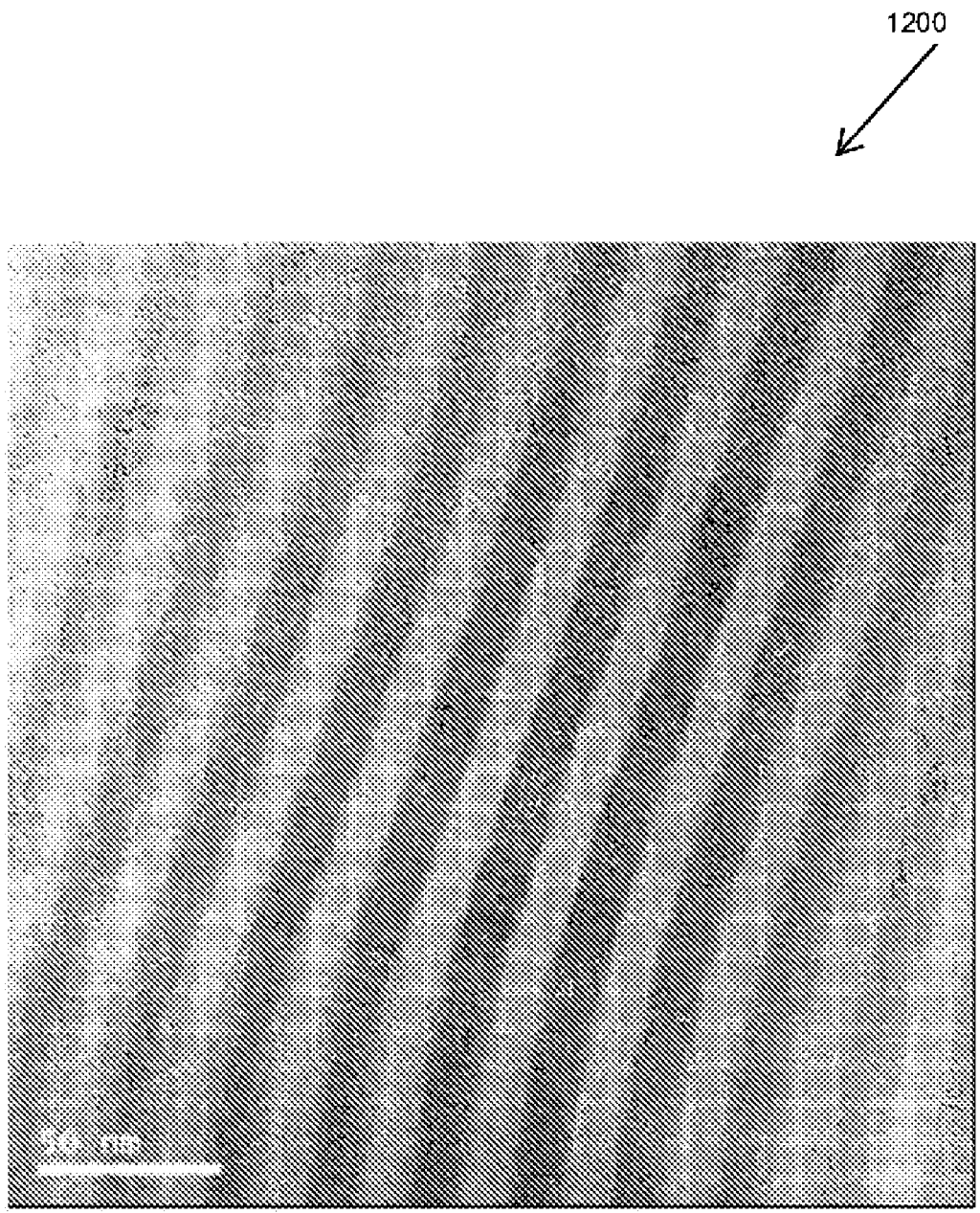
FIGS. 12A-12C are TEM images of an example of a lamellar structure (12A), along with chemical maps of boron (12B) and carbon (12C), of self-assembled polynorbornene-block-polynorbornenedecaborane copolymer containing 30 mol % norbornenedecaborane.
Figure 12B:
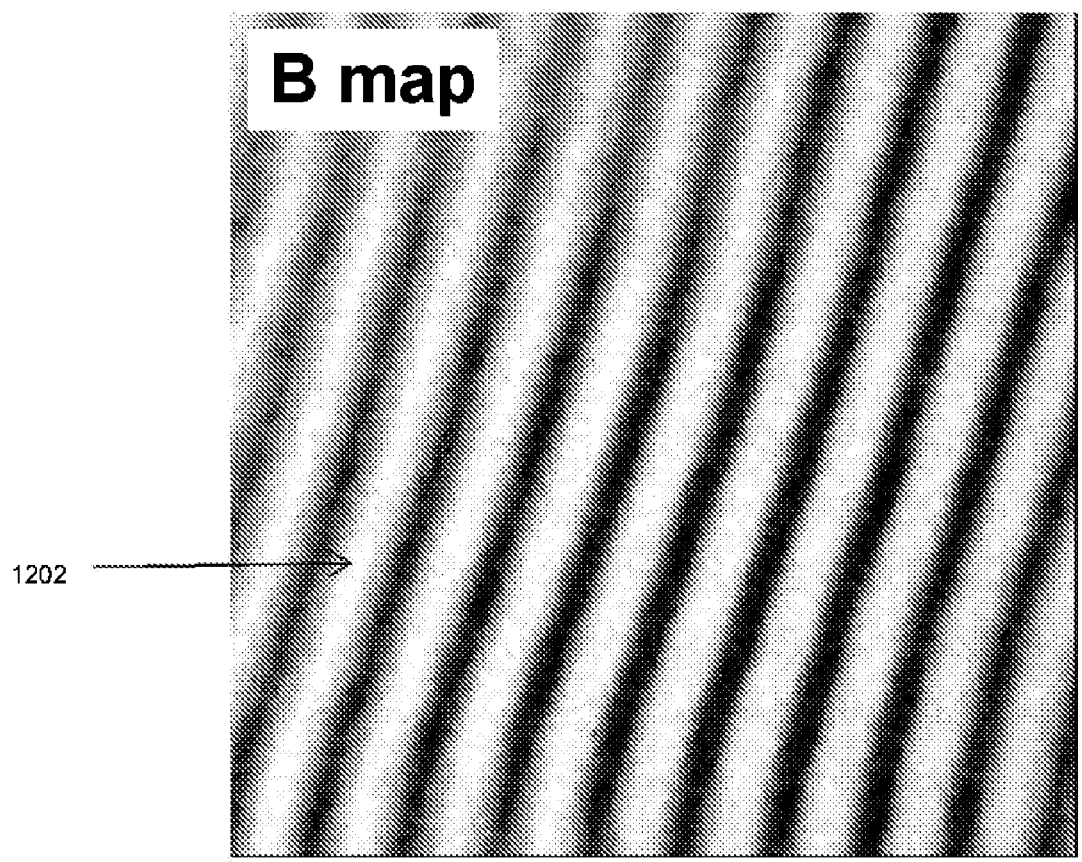
Figure 12C:
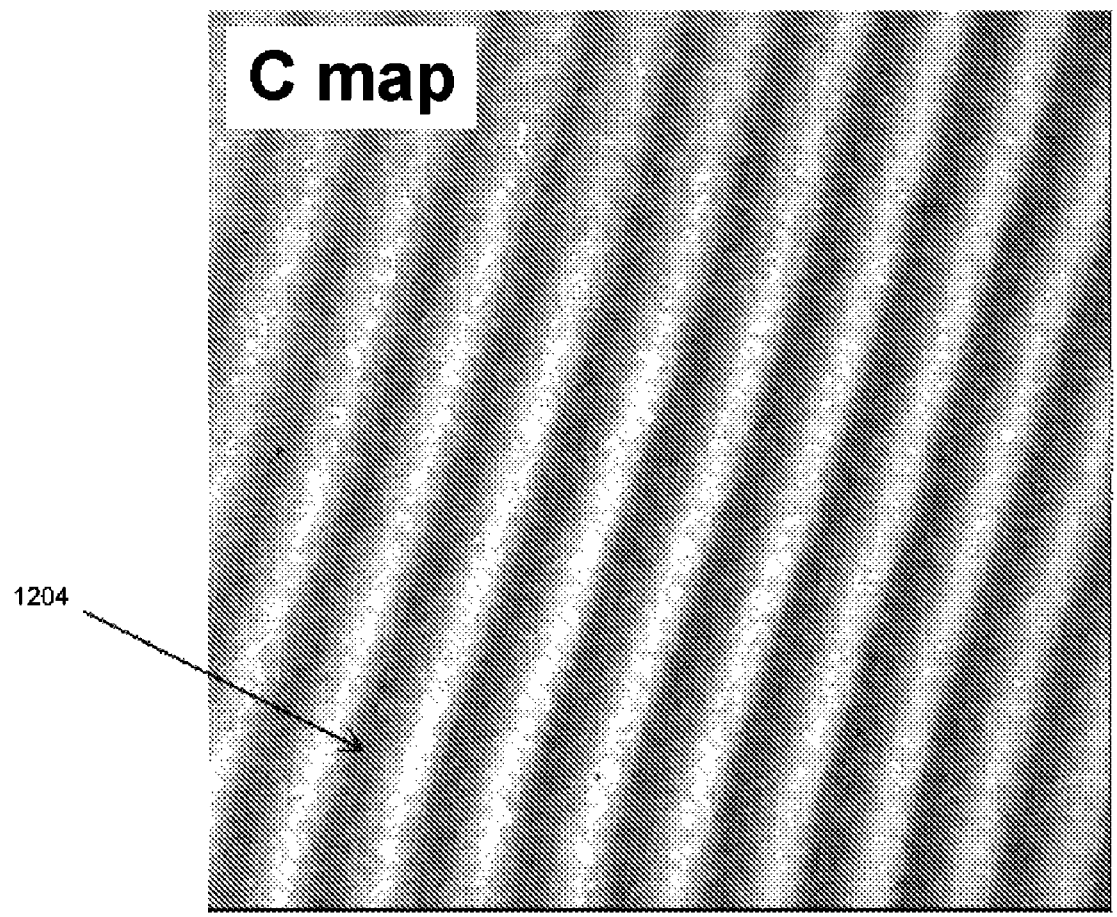

The block copolymer was dissolved in chloroform and the solvent was allowed to evaporate under an inert atmosphere to yield a film. Self-assembly occured during solvent evaporation. FIGS. 12A-12C are transmission electron microscopy (TEM) bright field images of the self-assembled polymer (1200, FIG. 12A) with the boron (bright regions, e.g., region 1202, FIG. 12B) and carbon (bright regions, e.g., region 1204, FIG. 12C) composition maps, showing a pure lamellar nano scale-ordered structure morphology with alternating polynorbornene and polynorbornenedecaborane layers.

Figure 13:
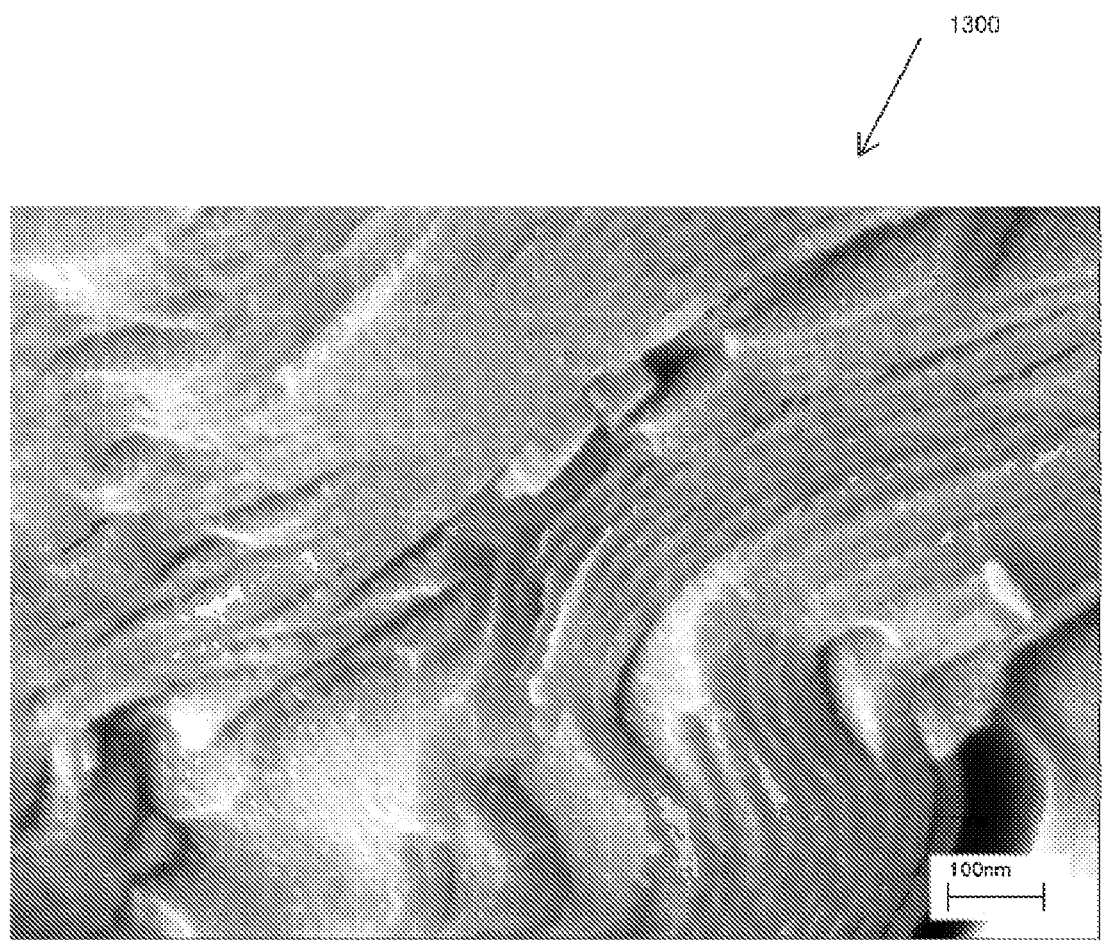
FIG. 13 is an SEM image depicting one example of a pyrolyzed ceramic structure from polynorbornene-block-polynorbornenedecaborane copolymer containing 30 mol % norbornenedecaborane, the image showing lamellar structure.

The dried film was then subjected to thermal annealing at 100° C. for 24 hours in a nitrogen atmosphere. The sample was subsequently transferred to a tube furnace where it was heated in a nitrogen atmosphere. The pyrolysis process involved heating the sample from room temperature to 400° C. at 5° C./min followed by a dwell time of 1 hour at 400° C. A subsequent ramp cycle was then used to bring the sample to 1000° C. (1° C./min). The sample was held at 1000° C. for 4 hours. The structure of the pyrolyzed ceramics is shown in the scanning electron microscope (SEM) image 1300 of FIG. 13. The pyrolyzed ceramics retained the lamellar morphology of the self-assembled polymer.

EXAMPLE 11

Synthesis, Self-Assembly and Pyrolysis of a Polynorbornene-Block-Polynorbornenedecaborane Copolymer This Example illustrates the synthesis by ROMP of a polynorbornene-block polynorbornenedecaborane copolymer containing 30 mol % polynorbornene-decaborane, the subsequent self-assembly of the block copolymer via solvent evaporation to form cylindrical, ordered structures, and further pyrolysis of the self-assembled block copolymer into a cylindrical ordered mesoporous BCN ceramic.

A solution of norbornene (1.5 g in 100 mL DCM) was cooled to −30° C. using a dry ice acetone bath for 15 min. To this solution was added a 5 ml solution containing 115 mg of GG3 catalyst. The resulting mixture stirred for 30 min at −30° C. A solution of norbornene-decaborane (1.54 g in 10 mL DCM) was added to the reaction mixture quickly via syringe. The reaction bath temperature was maintained at −20° C. for 15 min. and allowed to warm up to 0° C. (15 min) and it continued for another 30 min. while warming up to 10° C. The reaction was quenched with 3 mL of ethyl vinyl ether. After 15 min, the reaction solution was concentrated down and DCM was added to end up with about 50 mL of solution. The polymer solution was added drop wise to 600 mL of pentane. Most of the pentane was decanted onto a filter, and the rest of the solution was placed in centrifuge tubes and stored overnight in a freezer. The polymer was dried overnight at room temperature (RT) providing 2.62 g of product from the centrifuge tubes. Total yield was 2.90 g.

Figure 14A:
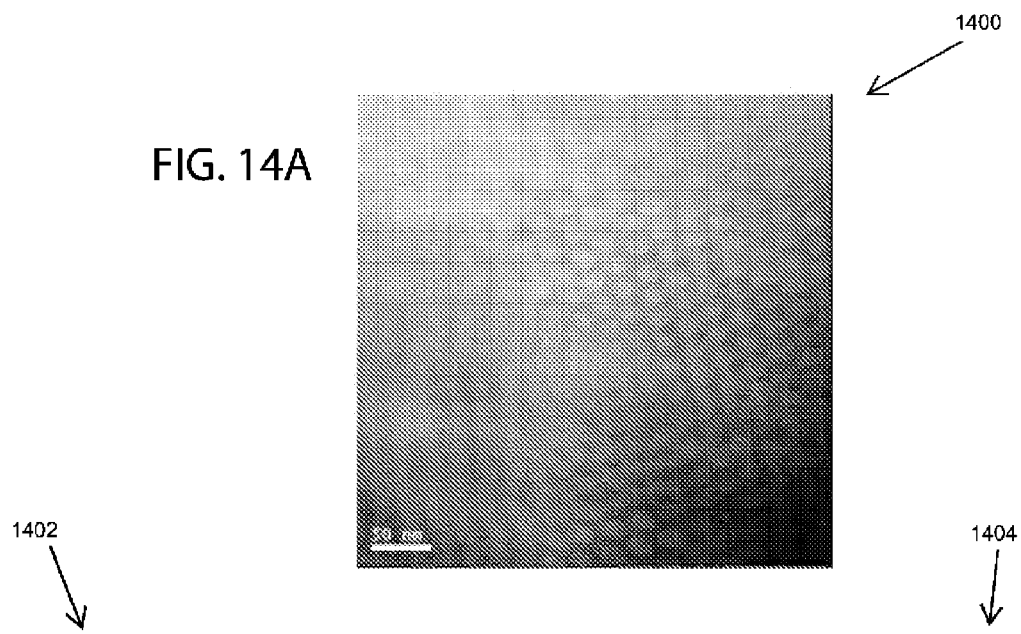
FIGS. 14A-14C are TEM images of an example of a cylindrical structure (14A), along with chemical maps of boron (14B) and carbon (14C), of self-assembled polynorbornene-block-polynorbornenedecaborane copolymer containing 30 mol % norbornenedecaborane.
Figure 14B:
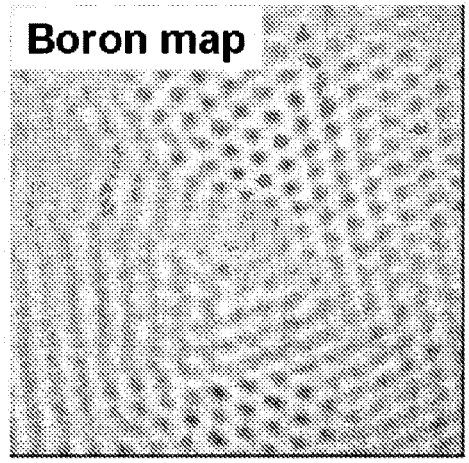
Figure 14C:
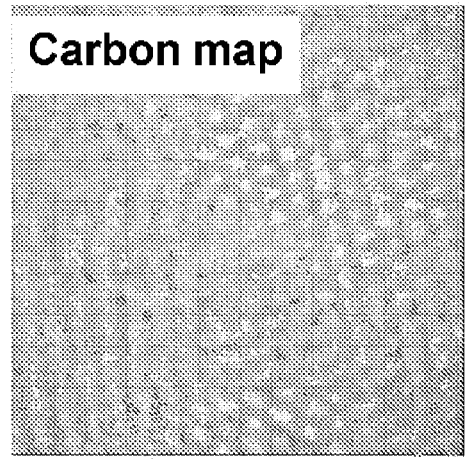

The block copolymer was dissolved in tetrahydrofuran and the solvent was allowed to evaporate under an inert atmosphere to yield a film. Self-assembly occurred during solvent evaporation. FIGS. 14A-14C are TEM bright field image of the self-assembled polymer (1400, FIG. 14A) with the boron (1402, FIG. 14B) and carbon (1404, FIG. 14C) composition maps, showing cylindrical nanoscale-ordered morphology with polynorbornene as the cylinders and polynorbornenedecaborane as the matrix.

Figure 15:
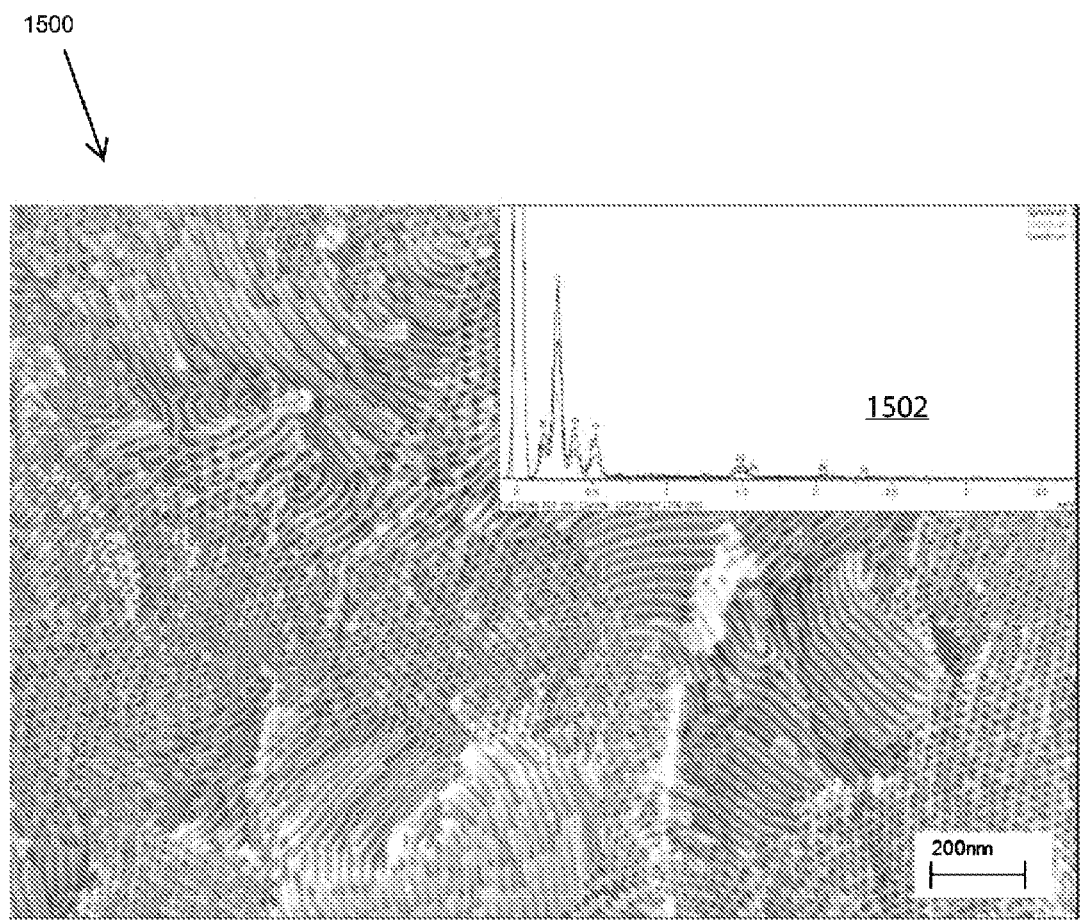
FIG. 15 is an SEM image depicting one example of a pyrolyzed ceramic structure from polynorbornene-block-polynorbornenedecaborane copolymer containing 30 mol % norbornenedecaborane, the image showing cylindrical structure and the inset revealing the BCN composition of the material as determined by electron dispersive X-ray spectroscopy (EDS)

The dried film was then subjected to thermal annealing at 100° C. for 24 hours in a nitrogen atmosphere. The sample was subsequently transferred to a tube furnace where it was heated in a nitrogen atmosphere. The pyrolysis process involved heating the sample from room temperature to 400° C. at 5° C./min followed by a dwell time of 1 hour at 400° C. A subsequent ramp cycle was then used to bring the sample to 1000° C. (1° C./min). The sample was held at 1000° C. for 4 hours. The structure of pyrolyzed ceramics is shown in the SEM image 1500 of FIG. 15. The pyrolyzed ceramics retained the cylindrical morphology of the self-assembled polymer. The inset 1502 in FIG. 15 shows the BCN composition of the material, as determined by electron dispersive X-ray spectroscopy (EDS). The polynorbornenedecaborane block ceramized into a BCN ceramic matrix, while the polynorbornene block decomposed and left behind nanosized cylindrical pores.

EXAMPLE 12

Synthesis, Self-Assembly and Pyrolysis of a Polynorbornene-Block-Polynorbornenedecaborane Copolymer This Example illustrates the synthesis by ROMP of a polynorbornene-block polynorbornenedecaborane copolymer containing 30 mol % polynorbornene-decaborane, subsequent self-assembly of the block copolymer via solvent evaporation into cylindrically-ordered structures, and further pyrolysis of the self-assembled block copolymer into a cylindrically-ordered mesoporous BN ceramic.

A solution of norbornene (2.5 g in 50 mL DCM) was cooled to −40° C. using a Dry Ice/acetone bath. This solution was added to a 10 mL solution containing 191 mg of GG3 catalyst. The monomer was added quickly via funnel, and the funnel was rinsed with about 5-10 mL of DCM. After mixing, the reaction went for 30 min. at about −30° C. Subsequently, a solution of norbornene-decaborane (2.5 g in 20 mL DCM) was added to the reaction mixture quickly via syringe. The reaction bath temperature was maintained between −20° C. and −10° C. for 30-40 min. The reaction was quenched with 2.5 mL of ethyl vinyl ether and stirred for 15 min. at 0° C. The reaction solution was filtered through silica using DCM as the eluant. The overall volume was taken down to about 100 mL and was added dropwise to a mixture of 300 mL of pentane and 150 mL of pet ether. Most of the pentane/pet ether was decanted, and the residual solvent was removed by rotary evaporation. The polymer was dried at RT under vacuum. Total yield was 4.76 g.

Figure 16:
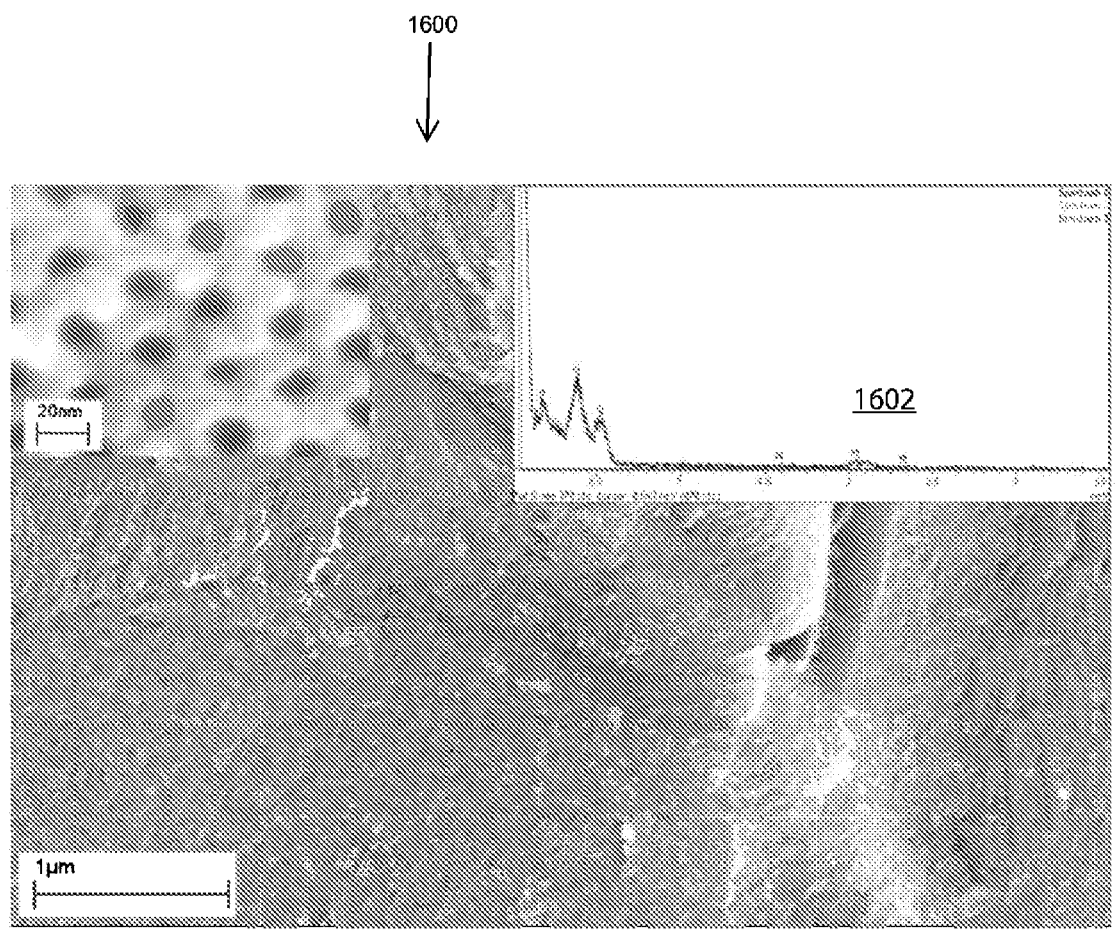
FIG. 16 is an SEM image depicting one example of a pyrolyzed ceramic structure from polynorbornene-block-polynorbornenedecaborane copolymer containing 30 mol % norbornenedecaborane, the left inset showing cylindrical structure and the right inset revealing the BN composition of the material as determined by EDS.
Figure 17:
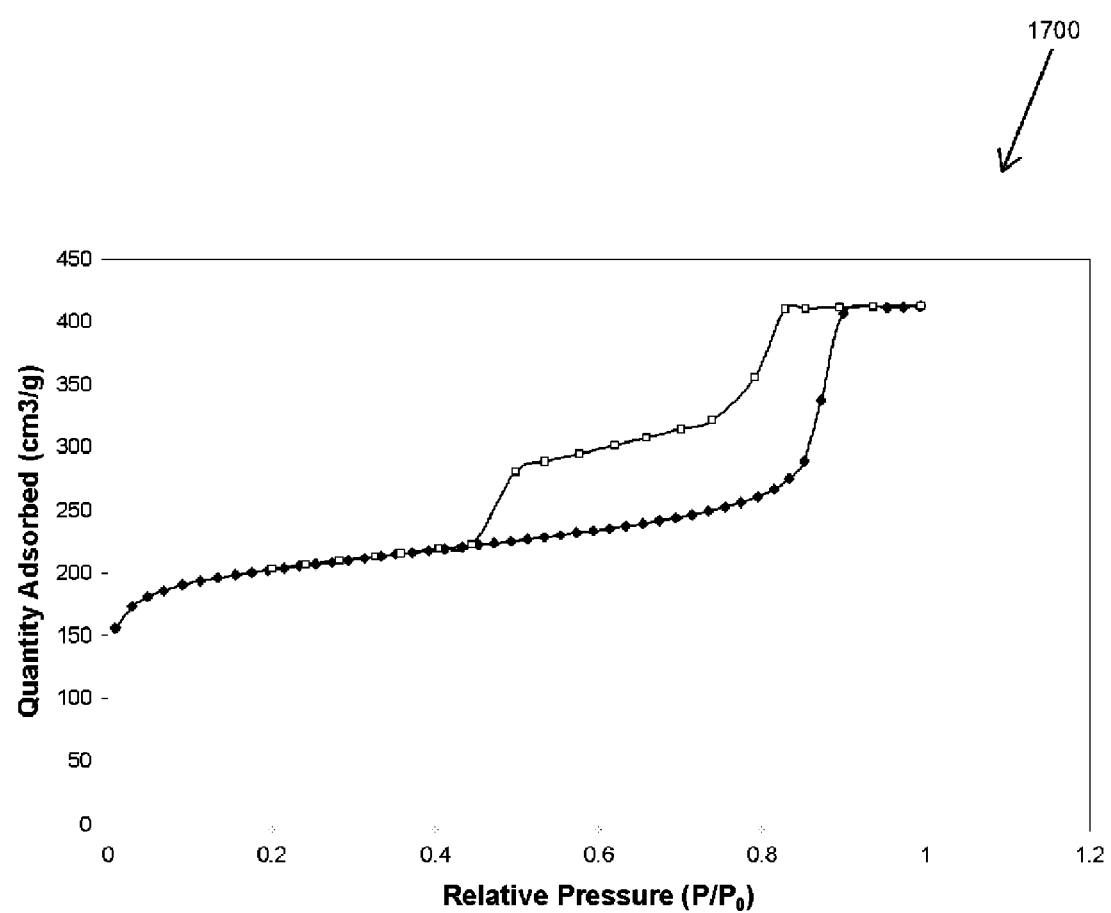
FIG. 17 is one example of a Brunauer-Emmett-Teller (BET) adsorption-desorption isotherm of BN mesoporous ceramic from self-assembled polynorbornene-block-polynorbornenedecaborane copolymer containing 30 mol % norbornenedecaborane.

The block copolymer was dissolved in tetrahydrofuran and the solvent was allowed to evaporate under an inert atmosphere. Self-assembly occurred during solvent evaporation. The dried block copolymer film resulting after evaporation was then subjected to thermal annealing at 100° C. for 24 hours in a nitrogen atmosphere. The sample was subsequently transferred to a tube furnace where it was heated in an ammonia atmosphere. The sample was pyrolyzed by heating the sample from room temperature to 400° C. at 5° C./min, followed by a dwell time of 1 hour at 400° C. A subsequent ramp cycle was then used to bring the sample to 1000° C. (1° C./min). The sample was held at 1000° C. for 4 hours. The structure of the pyrolyzed ceramics is shown in the SEM image 1600 in FIG. 16. The pyrolyzed ceramic shows cylindrical morphology and the composition, as determined by EDS (see inset 1602 in FIG. 16) is primarily BN. Brunauer-Emmett-Teller (BET) tests confirm that the ordered ceramic is a mesoporous material with high surface area, as shown in the graph 1700 of FIG. 17.

EXAMPLE 13

Synthesis, Self-Assembly and Pyrolysis of a Polynorbornenesilazane-Block -Polynorbornenedecaborane Copolymer This Example illustrates the synthesis, by ROMP, of a polynorbornenesilazane-block-polynorbornenedecaborane copolymer (1800, FIG. 18), in which the blocks are composed of polynorbornene backbone and silazane and decaborane pendant groups. Subsequent self-assembly of the block copolymer generates an ordered structure with polynorbornenesilazane and polynorbornenedecaborane in distinctly different domains. Further pyrolysis of the self-assembled block copolymer created ordered ceramics with a lamellar structure.

Figure 18:
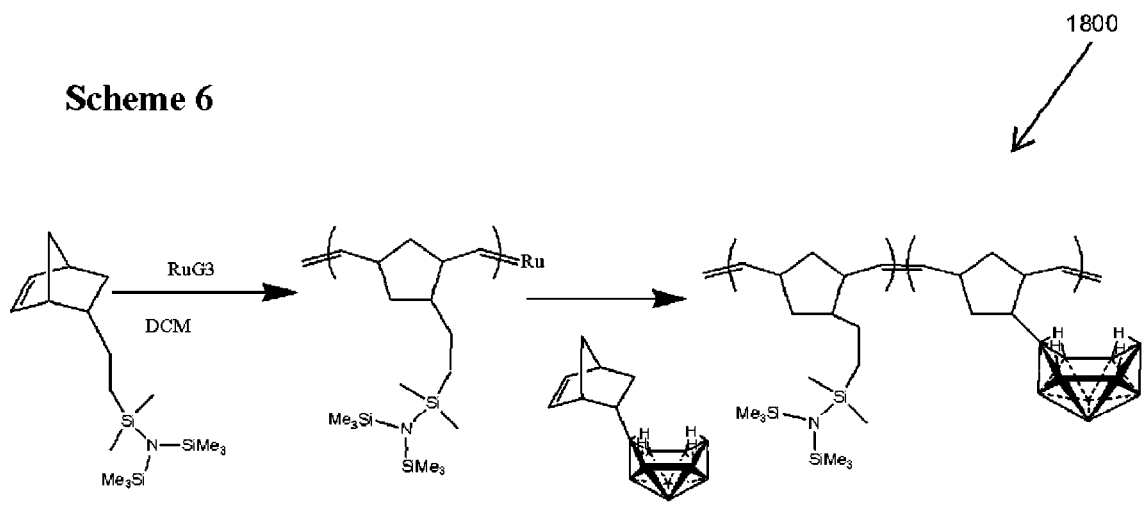
FIG. 18 (Scheme 6) depicts one example of the synthesis of a polynorbornenesilazane-block-polynorbornenedecaborane copolymer by ROMP.
Figure 19A:
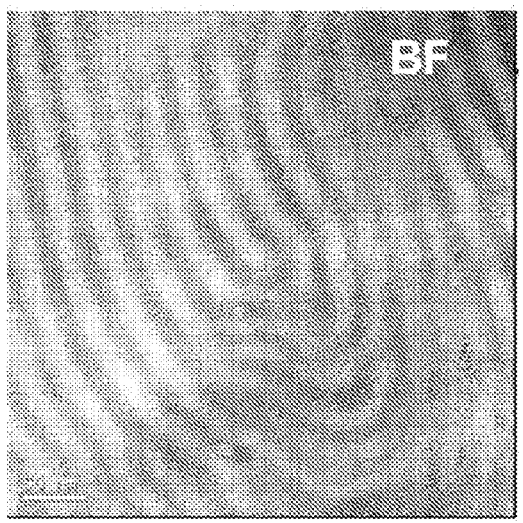
FIGS. 19A-19C are TEM images of an example of a lamellar structure (19A), along with chemical maps of boron (19B) and silicon (19C), of self-assembled polynorbornenesilazane-block-polynorbornenedecaborane copolymer.
Figure 19B:
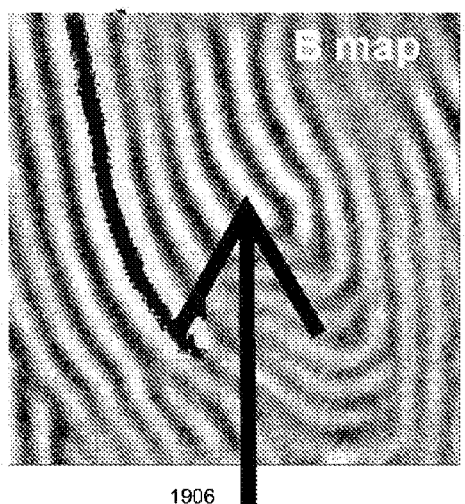
Figure 19C:
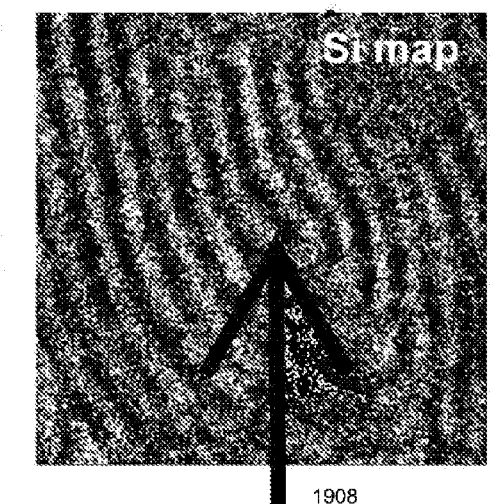

A solution of norbornene-hexamethylsilzane (2.00 g in 36 mL DCM) was cooled to −40° C. using a Dry Ice-acetone bath. This solution was added to a 3 mL solution containing 43 mg of GG3 catalyst. After 30 min in a bath at about −30° C., a solution of norbornene-decaborane (1.27 g in 10 mL DCM) was added to the reaction mixture. The reaction bath temperature was maintained between −20° C. and −10° C. for 45 min. The reaction was quenched with 2.5 mL of ethyl vinyl ether and stirred for 15 min at 0° C. The synthesis reaction is shown in Scheme 6 (FIG. 18). The solution was evaporated in an inert atmosphere to yield a film. Ordered structures were formed during the evaporation. A TEM microstructure 1900 is shown in FIG. 19A along with boron (1902, FIG. 19B) and silicon (1904, FIG. 19C) maps. The Si-containing polynorbornenesilazane block and B-containing polynorbornenedecaborane formed alternating layers in a lamellar structure. Arrows 1906 and 1908 mark equivalent sites in maps 1902 and 1904.

Figure 20:
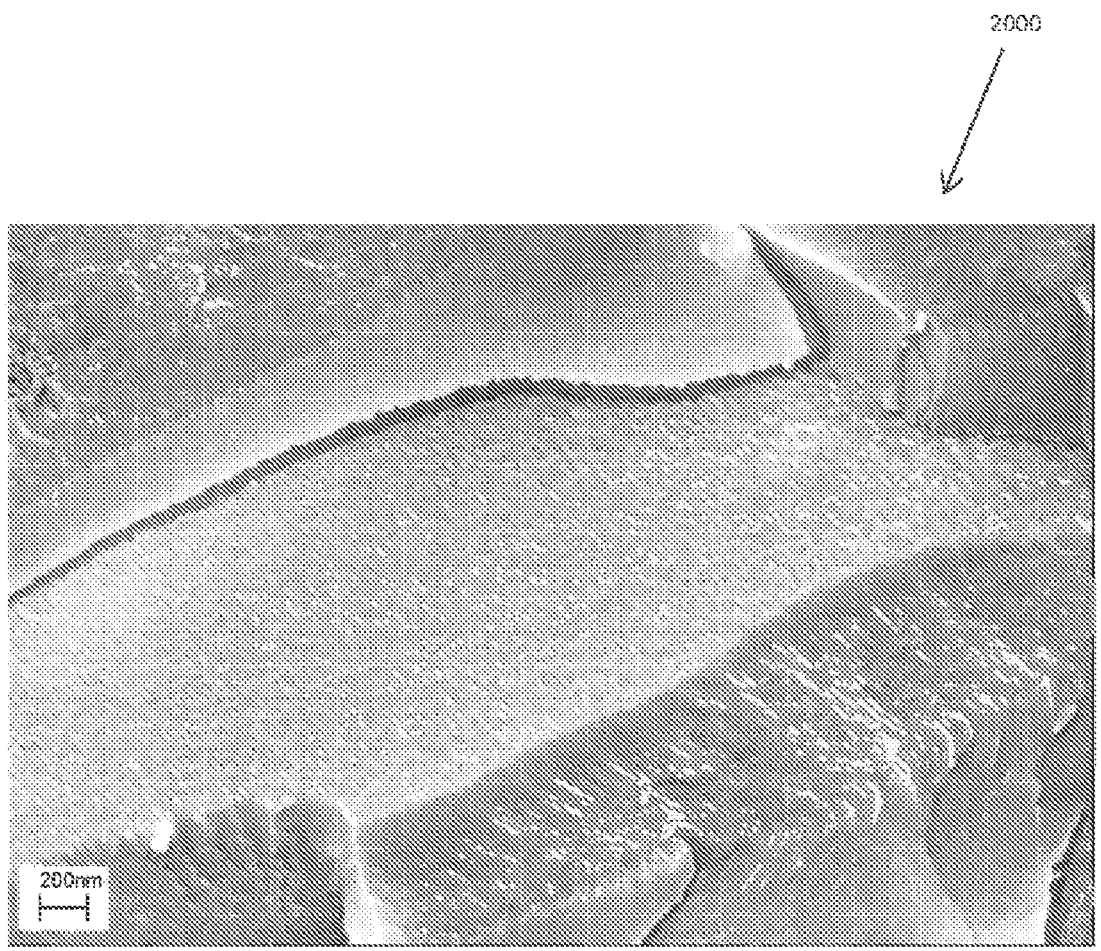
FIG. 20 is an SEM image depicting one example of a pyrolyzed ceramic structure from polynorbornenesilazane-block-polynorbornenedecaborane copolymer, showing lamellar structure.

The dried polymer film was then subjected to thermal annealing at 100° C. for 24 hours in a nitrogen atmosphere. The sample was subsequently transferred to a tube furnace where it was heated in an ammonia atmosphere. The pyrolysis process involved heating the sample from room temperature to 400° C. at 5° C./min followed by a dwell time of 1 hour at 400° C. A subsequent ramp cycle was then used to bring the sample to 1000° C. (1° C./min). The sample was held at 1000° C. for 4 hours. The structure of pyrolyzed ceramics 2000 is shown in FIG. 20. The pyrolyzed ceramics showed nano-ordered structure with lamellar morphology, preserving the morphological characteristics of the self-assembled polymer.

EXAMPLE 14

Incorporation of a Metal Cluster into a Hybrid Block Copolymer

Figure 22:
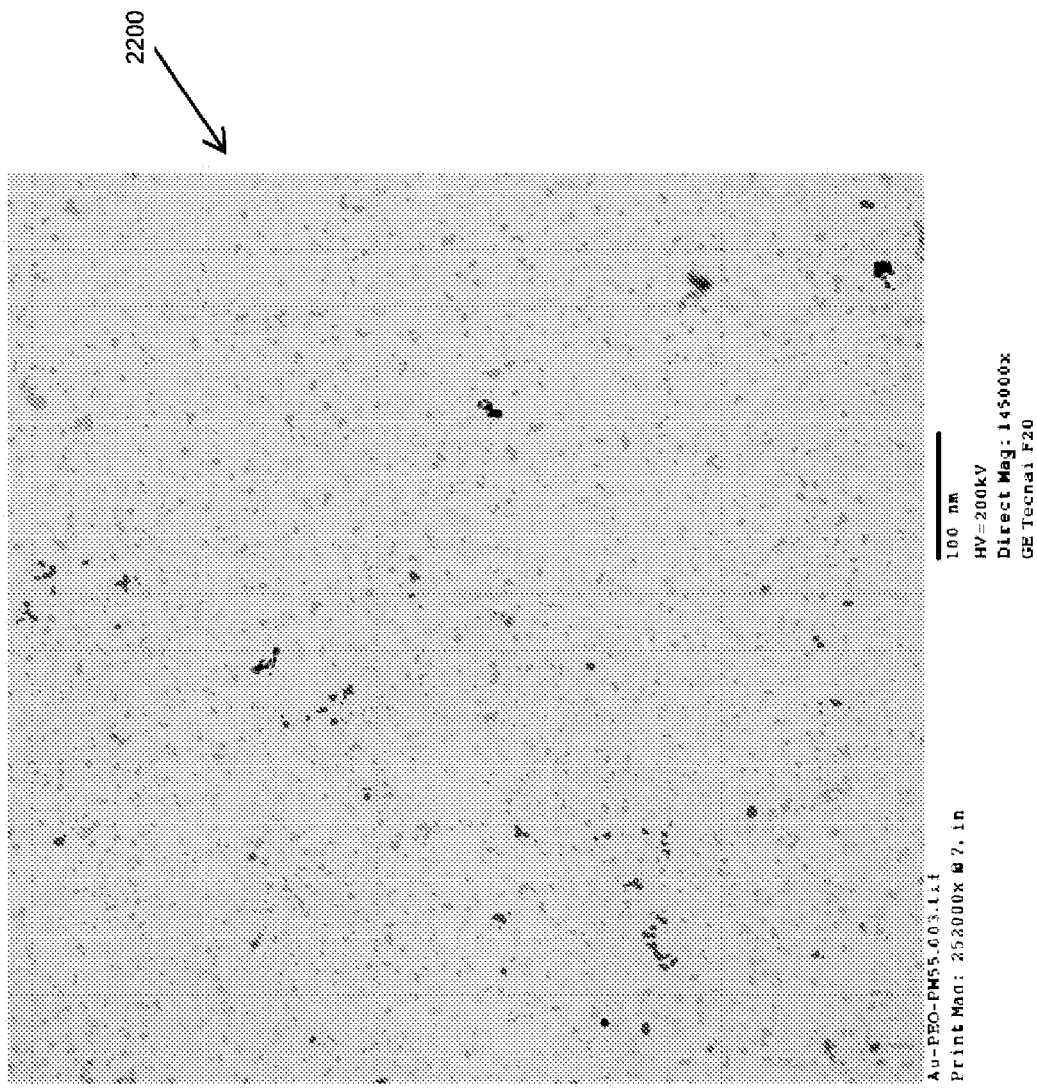
FIG. 22 is a TEM image showing an example of gold particles distributed in a polynorbornenedecaborane matrix.
Figure 23:
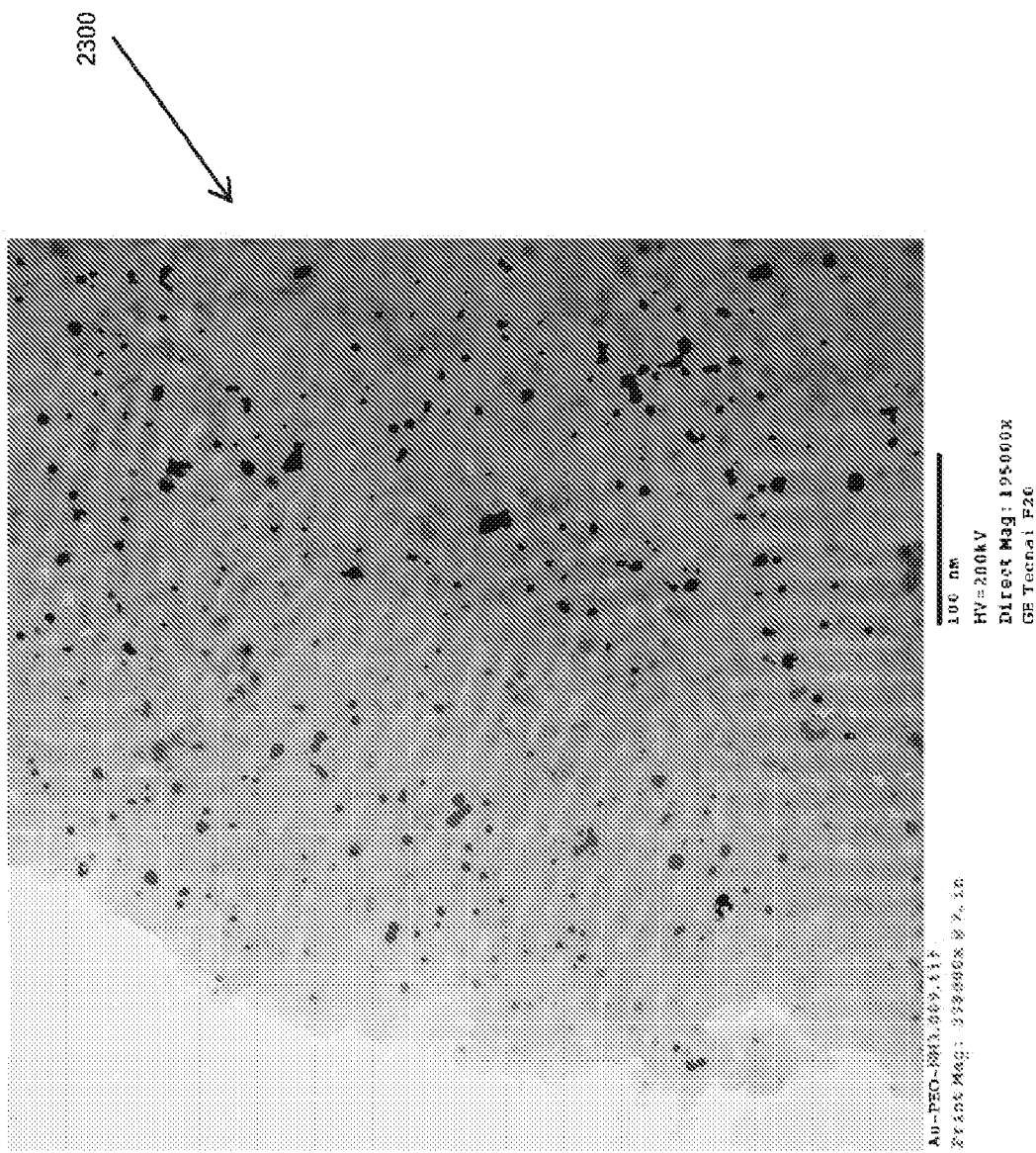
FIG. 23 is a TEM image of one example of a mesoporous boron nitride structure with gold particles dispersed in the boron nitride matrix.

Gold particles were coated with polyethylene oxide in a manner analogous to Brust et al., "Synthesis of Thiol-derivitised Gold Nanoparticles in a Two-phase Liquid-Liquid System," *J. Chem. Soc., Chem. Commun.*, 1994, 801-802, the contents of which are incorporated herein by reference. Specifically, tetraoctylammonium bromide (0.738 g, 1.35 mmol) dissolved in toluene (30 mL) was added to a flask containing $HAuCl_4 \cdot 3H_2O$ (0.122 g, 0.3 mmol) dissolved in $H_2O$ (20 mL) and stirred vigorously. Thiol terminated poly(ethylene oxide) (Mn=2000, Mw/Mn=1.05, 0.602 g, 0.3 mmol) was added to the mixture. $NaBH_4$ (0.125 g, 3.3 mmol) in $H_2O$ (10 mL) was added drop-wise over 30 min and the reaction mixture turned dark purple in color. The reaction mixture was stirred at room temperature for 3 hours at which point the purple $H_2O$ layer containing the Au particles was separated from the colorless toluene layer. The Au particles were purified in the $H_2O$ layer through centrifugation at 4000 rpm for 30 min. The particles were further washed by the repeated addition of water and centrifugation (3 times) followed by methanol and then resuspended in THF, yielding particles of gold coated with PEO. PEO-coated gold particles were then dispersed in a solution of THF. This solution was combined with a 5 wt. % solution of a polynorbornene-block-polydecaborane containing 30 mol % polydecaborane in THF. The mixed solution was allowed to slowly evaporate in an inert atmosphere to yield a film composed of a hexagonally packed cylindrical structure. The gold particles were distributed in the polydecaborane matrix (2200, FIG. 22). Pyrolysis in ammonia at 800° C. for 30 minutes led to a mesoporous BN structure with gold particles in the BN matrix (2300, FIG. 23). No apparent growth of gold particles was observed.

EXAMPLE 15

Figure 24:
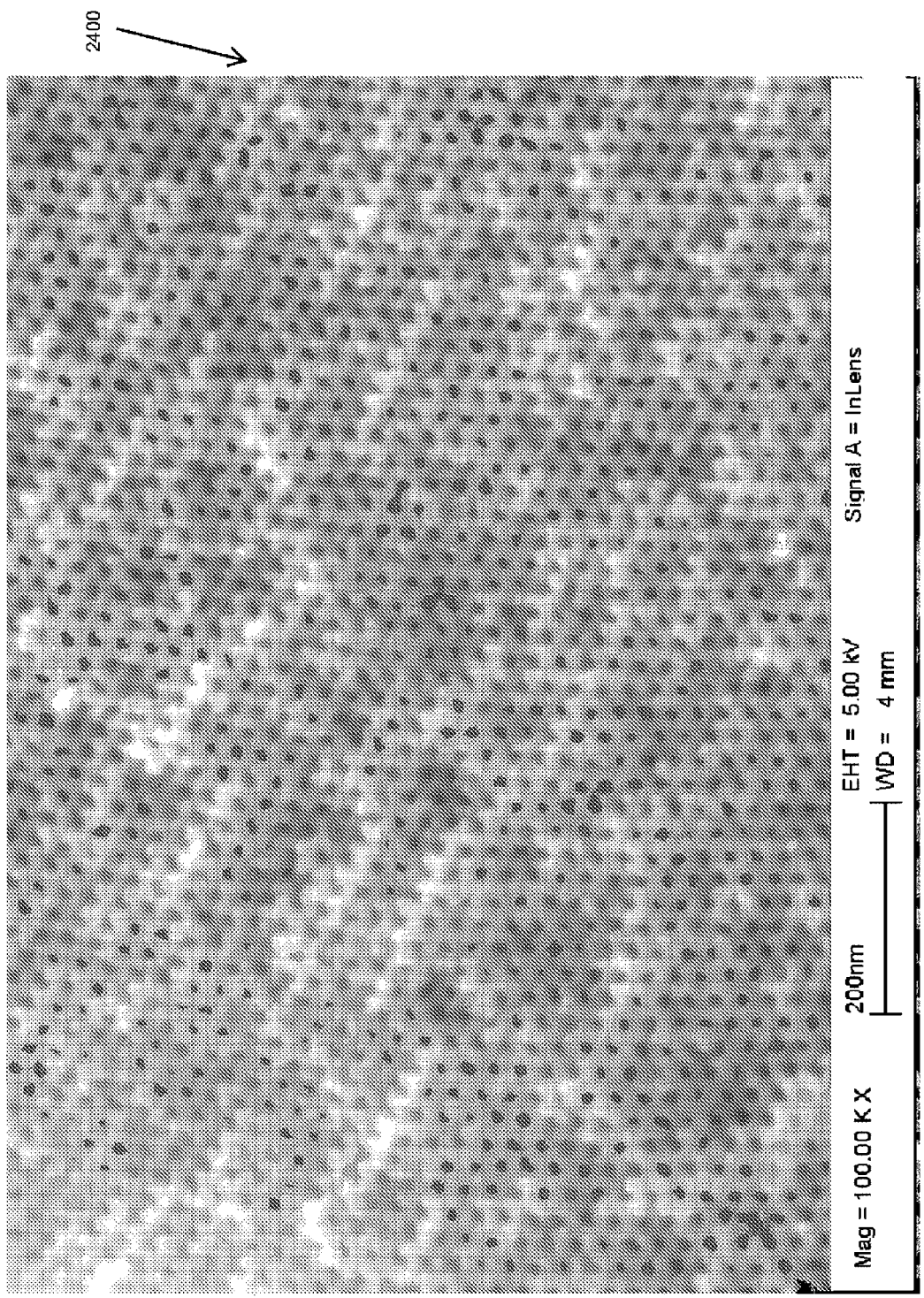
FIG. 24 is an SEM image of one example of a mesoporous amorphous ceramic containing B, N, C, O and Zr.
Figure 25:
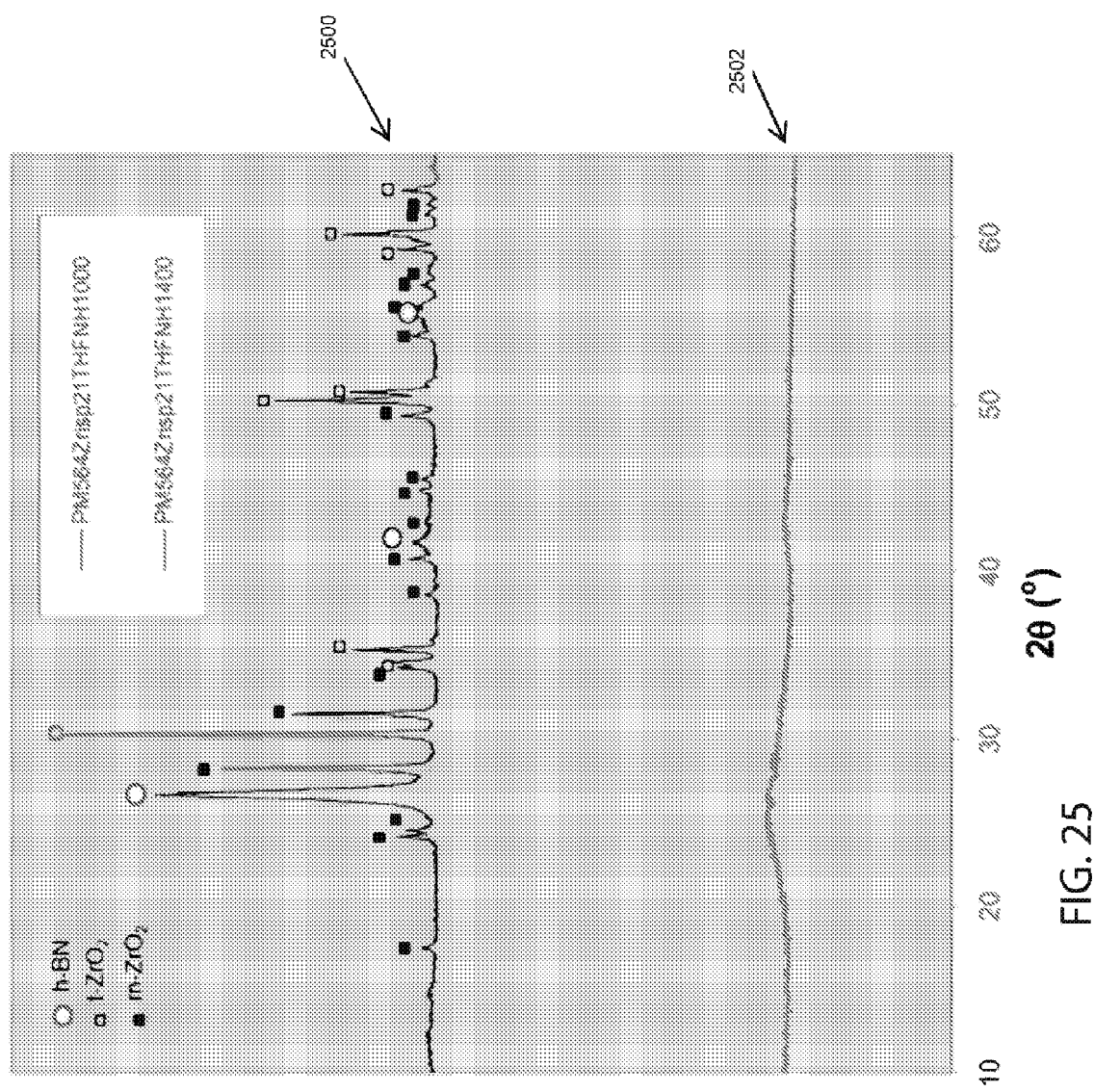
FIG. 25 is a graph of one example of the X-ray diffraction patterns of crystalline (upper curve) and amorphous (lower curve) phases of a mesoporous crystalline composite of BN and $ZrO_2$.

Incorporation of a Metal Alkoxide into a Hybrid Block Copolymer, Leading to Mesoporous Metal Oxide/BN Structure Zirconia n-propoxide was dissolved in THF to form a 5 wt. % solution. This solution was combined with a 5 wt. % solution of a polynorbornene-block-polydecaborane containing 30 mol % polydecaborane in THF. The mixed solution was allowed to slowly evaporate in an inert atmosphere, yielding a film composed of a hexagonally packed cylindrical structure. Pyrolysis in ammonia at 1000° C. for 4 h led to a mesoporous, amorphous ceramic that contained B, N, C, O and Zr (2400, FIG. 24). Further treatment at 1400° C. for 4 h led to a crystalline composite of BN and $ZrO_2$ having both crystalline and amorphous phases (FIG. 25, upper (2500) and lower (2502) curves, respectively).

EXAMPLE 16

Figure 26:
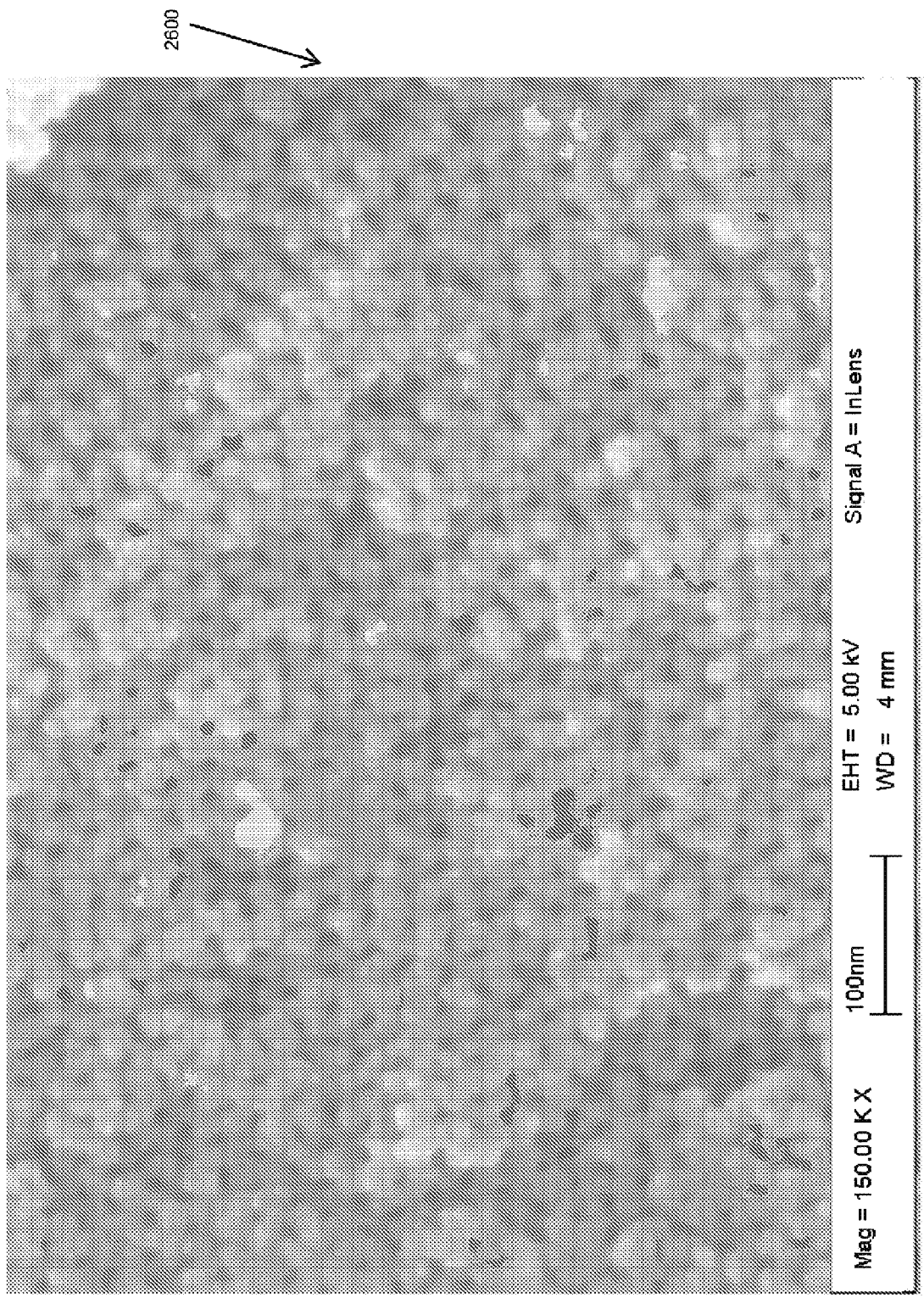
FIG. 26 is an SEM image of a one example of mesoporous, amorphous ceramic containing B, N, C, O and Ti.
Figure 27:
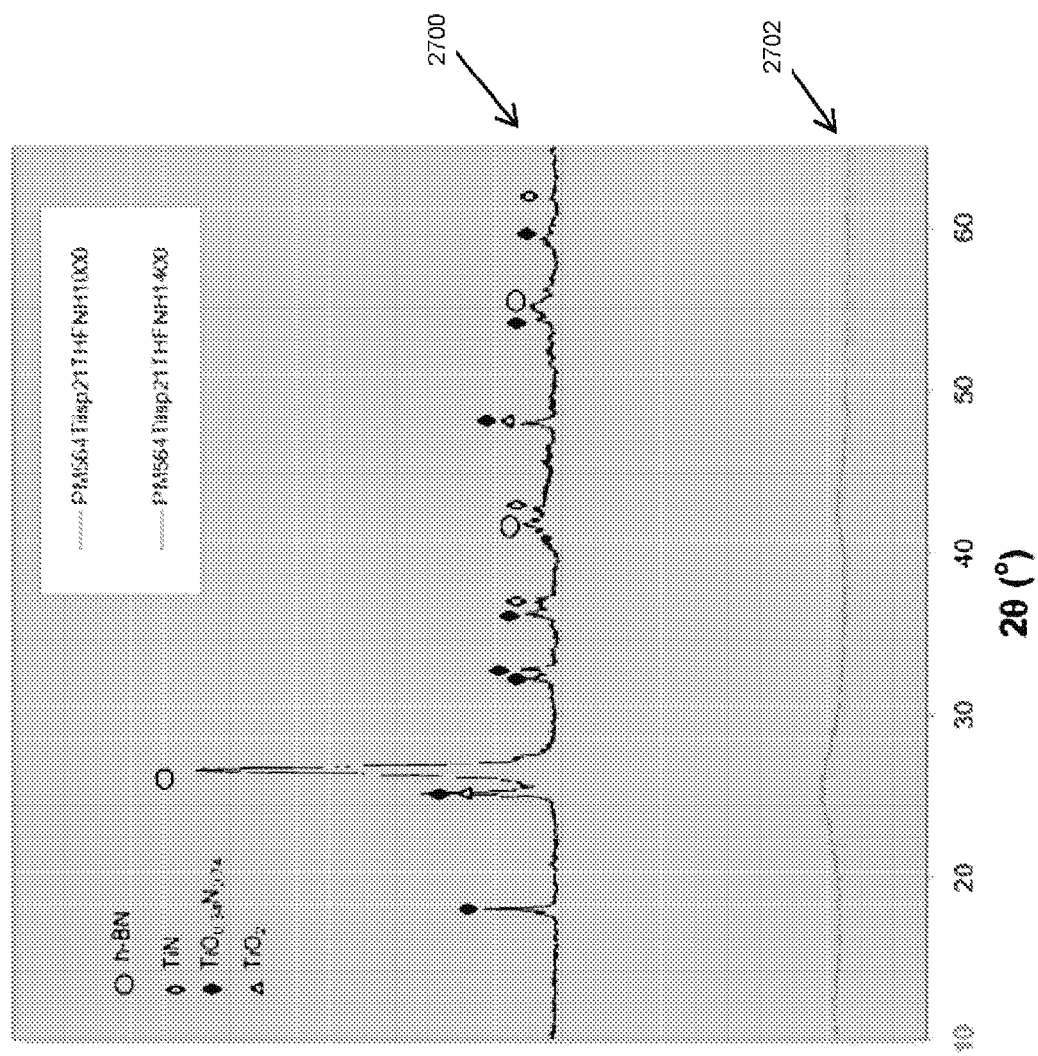
FIG. 27 is a graph of one example of the X-ray diffraction patterns of crystalline (upper curve) and amorphous (lower curve) phases of a mesoporous crystalline composite of BN, TiN, TiON and $TiO_2$.

Incorporation of a Metal Alkoxide into a Hybrid Block Copolymer, Leading to Mesoporous Metal Oxynitride/BN Structure Titanium isopropoxide was dissolved into THF to form a 5 wt. % solution. This solution was combined with a 5 wt. % solution of a polynorbornene-block-polydecaborane containing 30 mol % polydecaborane in THF. The mixed solution was allowed to slowly evaporate in an inert atmosphere, yielding a film composed of a hexagonally packed cylindrical structure. Pyrolysis in ammonia at 1000° C. for 4 hours led to a mesoporous, amorphous ceramic that contained B, N, C, O and Ti (2600, FIG. 26). Further treatment at 1400° C. for 4 hours led to a crystalline composite of BN, TiN, TiON and $TiO_2$ having both crystalline and amorphous phases (FIG. 27, upper (2700) and lower (2702) curves, respectively).

EXAMPLE 17

Figure 28:
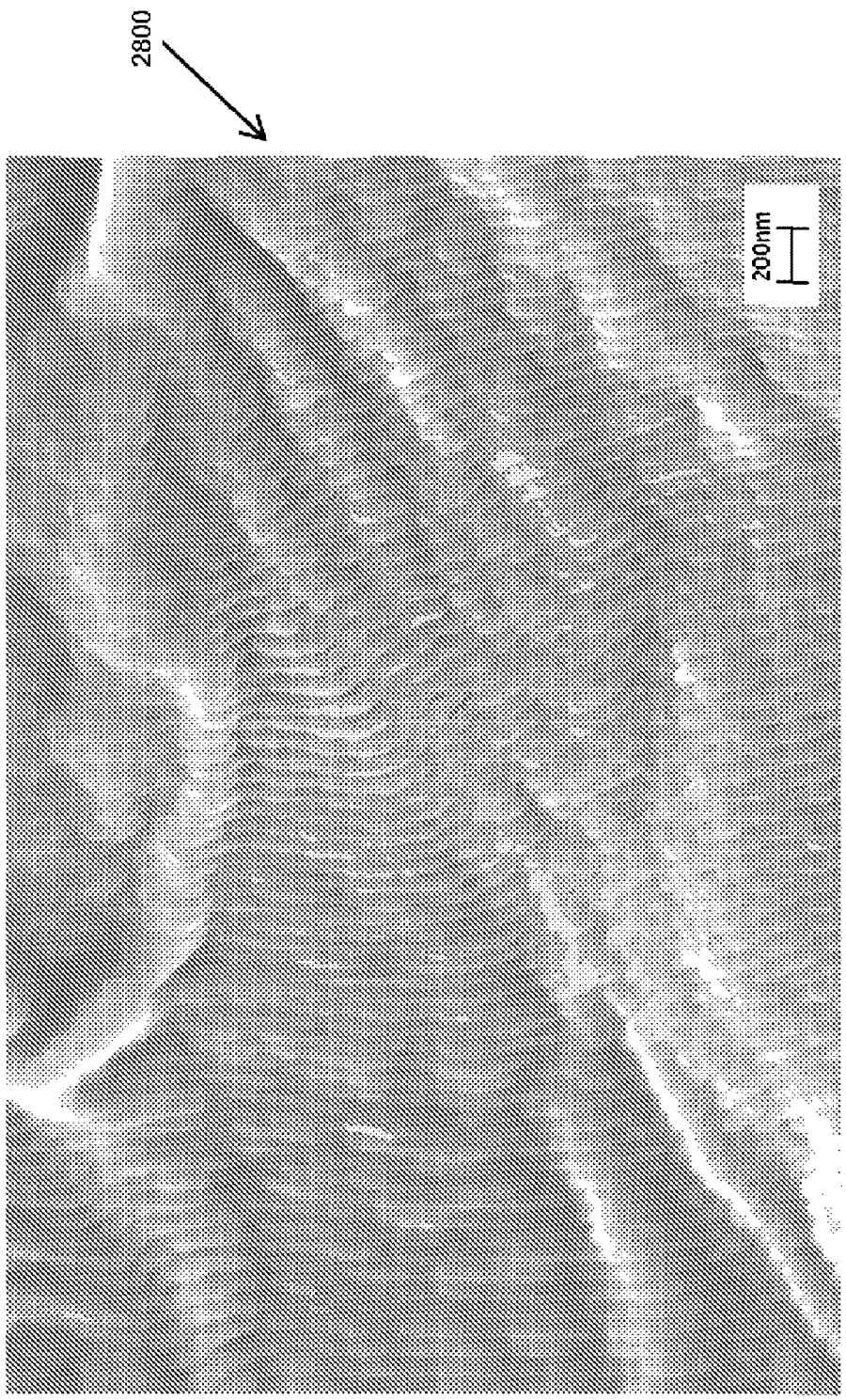
FIG. 28 is an SEM image of one example of a ceramic displaying a lamellar structure and containing the elements B, N, C, O and Ti.

Incorporation of a Metal Alkoxide into a Hybrid Block Copolymer, Leading to a Lamellar Structure Titanium isopropoxide was dissolved to THF to form a 5 wt. % solution. This solution was combined with a 5 wt. % solution of a polynorbornene-block-polynorbornenedecaborane containing 10 mol % polydecaborane in TEF. The mixture contained polynorbornene-block-polynorbornenedecaborane and titanium isopropoxide in a weight ratio of 5:1. The mixed solution was allowed to slowly evaporate in an inert atmosphere, yielding a film composed of a lamellar structure. Pyrolysis in ammonia at 1000° C. for 4 hours led to a ceramic that contains a lamellar structure and contained the elements B, N, C, O and Ti (2800, FIG. 28).

EXAMPLE 18

Figure 29:
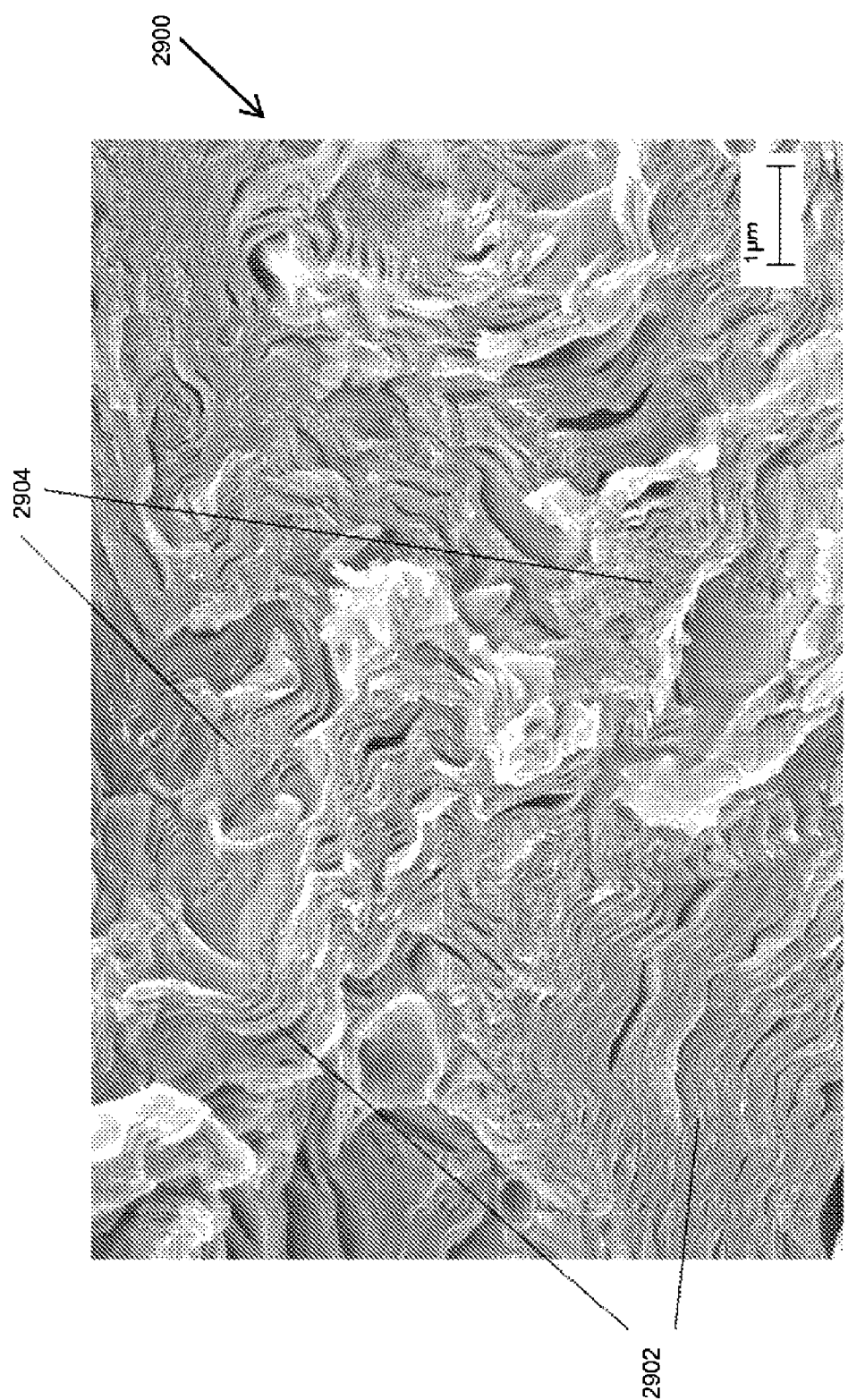
FIG. 29 is an SEM image of one example of a ceramic displaying part lamellar and part iverse cylindrical structure and containing the elements B, N, C, O and Ti.

Incorporation of a Metal Alkoxide into a Hybrid Block Copolymer, Leading to a Mixed Lamellar and Inverse Cylindrical Structure Titanium isopropoxide was dissolved in THF to form a 5 wt. % solution. This solution was combined with a 5 wt. % solution of a polynorbornene-block polybonorbornenedecaborane (containing 10 mol % polydecaborane) in THBF. The mixture contained polynorbornene-block-polynorbornenedecaborane and titanium isopropoxide in a weight ratio of 5:3. The mixed solution was allowed to slowly evaporate in an inert atmosphere to yield a film. Pyrolysis in ammonia at 1000° C. for 4 hours led to a ceramic that contains B, N, C, O and Ti, and showed a structure that is part lamellar (2902) and part inverse cylindrical (2904) (2900, FIG. 29).

EXAMPLE 19

Figure 30:
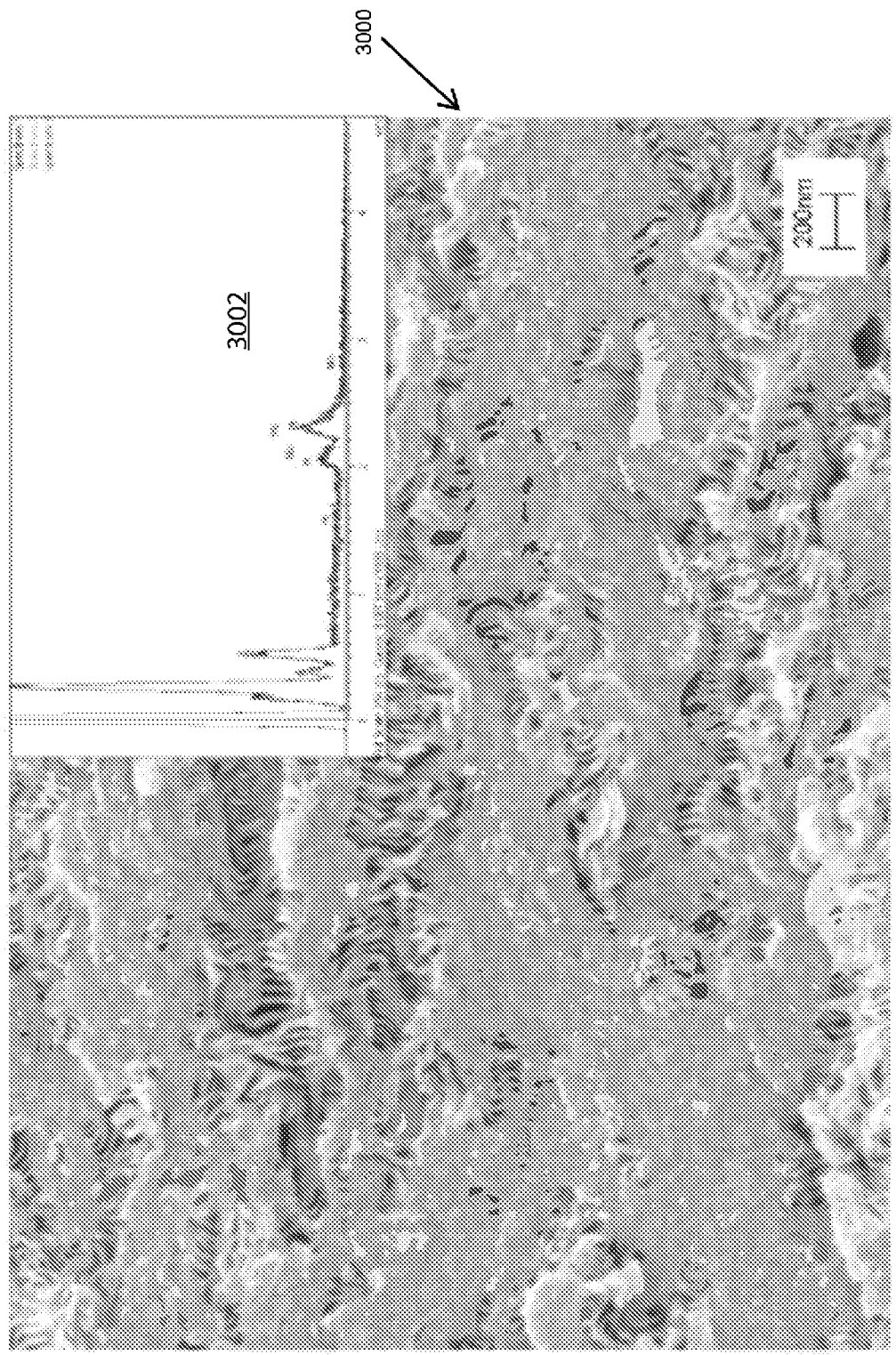
FIG. 30 is a an SEM image of one example of a ceramic having a lamellar structure and, as determined by EDS (inset) containing the elements B, N, C, O and Mo.

Incorporation of a Metal Alkoxide into a Hybrid Block Copolymer, Leading to a Lamellar Structure Molybdenum ethoxide was dissolved in THF to form a 5 wt. % solution. This solution was combined with a 5 wt. % solution of a polynorbornene-block -polynobornenedecaborane (containing 10 mol % polynorbornenedecaborane) in THF. The mixture contains polynorbornene-block-polynorbornenedecaborane and molybdenum ethoxide with a weight ratio of 5:1. The mixed solution was allowed to slowly evaporate in an inert atmosphere, yielding a film composed of a lamellar structure. Pyrolysis in ammonia at 1000° C. for 4 hours led to a ceramic having a lamellar structure and containing the elements B, N, C, O and Mo (3000, FIG. 30).

EXAMPLE 20

Figure 31A:
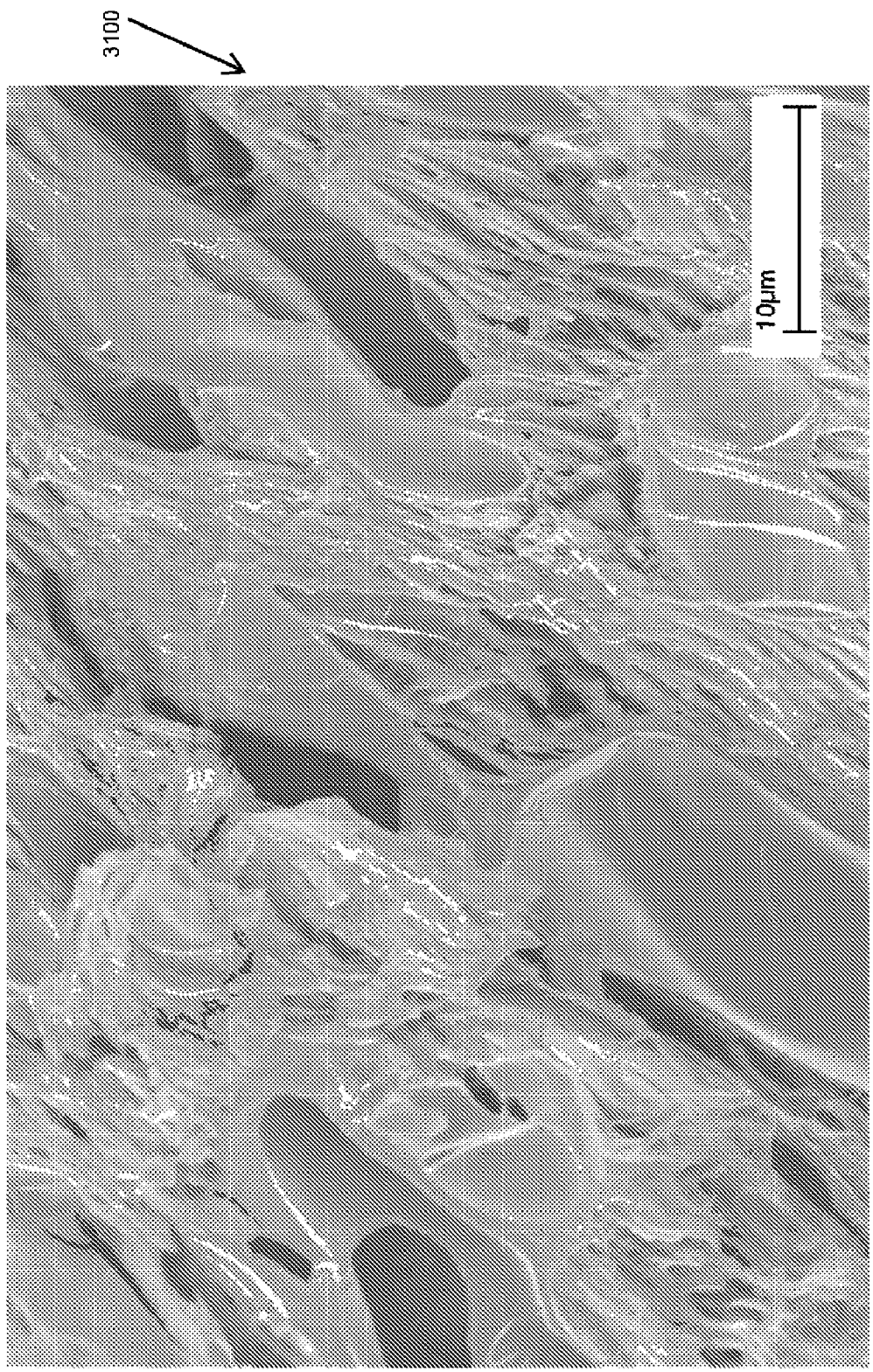
FIGS. 31A and 31B are SEM images of examples of a ceramic having both macro-pores and mesopores and containing molybdenum.
Figure 31B:
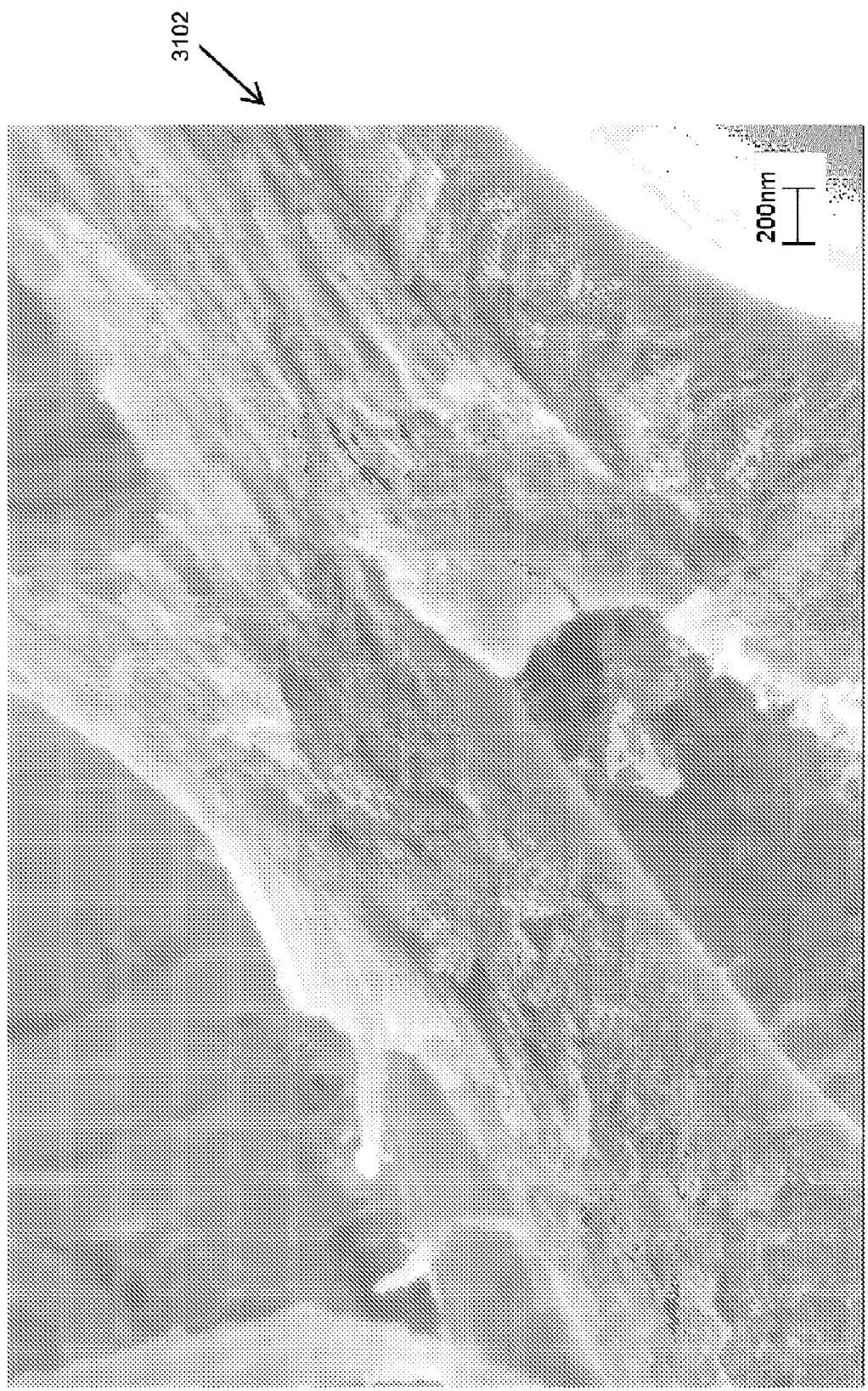

Incorporation of a Metal Alkoxide into a Hybrid Block Copolymer, Leading to a Porous Structure that Contains both Macro-Porosity and Mesoporosity Molybdenum ethoxide was dissolved in THF to form a 5 wt. % solution. This solution was combined with a 5 wt. % solution of a polynorbornene-block -polynorbornenedecaborane (containing 30 mol % polydecaborane) in THF. The mixture contained polynorbornene-block-polynorbornenedecaborane and molybdenum ethoxide in a weight ratio of 1:1. The mixed solution was allowed to slowly evaporate in an inert atmosphere to yield a film. Pyrolysis in ammonia at 1000° C. for 4 hours led to a ceramic that contained both macro-pores (3100, FIG. 31A) and mesopores (3102, FIG. 31B)

EXAMPLE 21

Synthesis of a Hybrid Tri-Block Copolymer Containing

Figure 32:
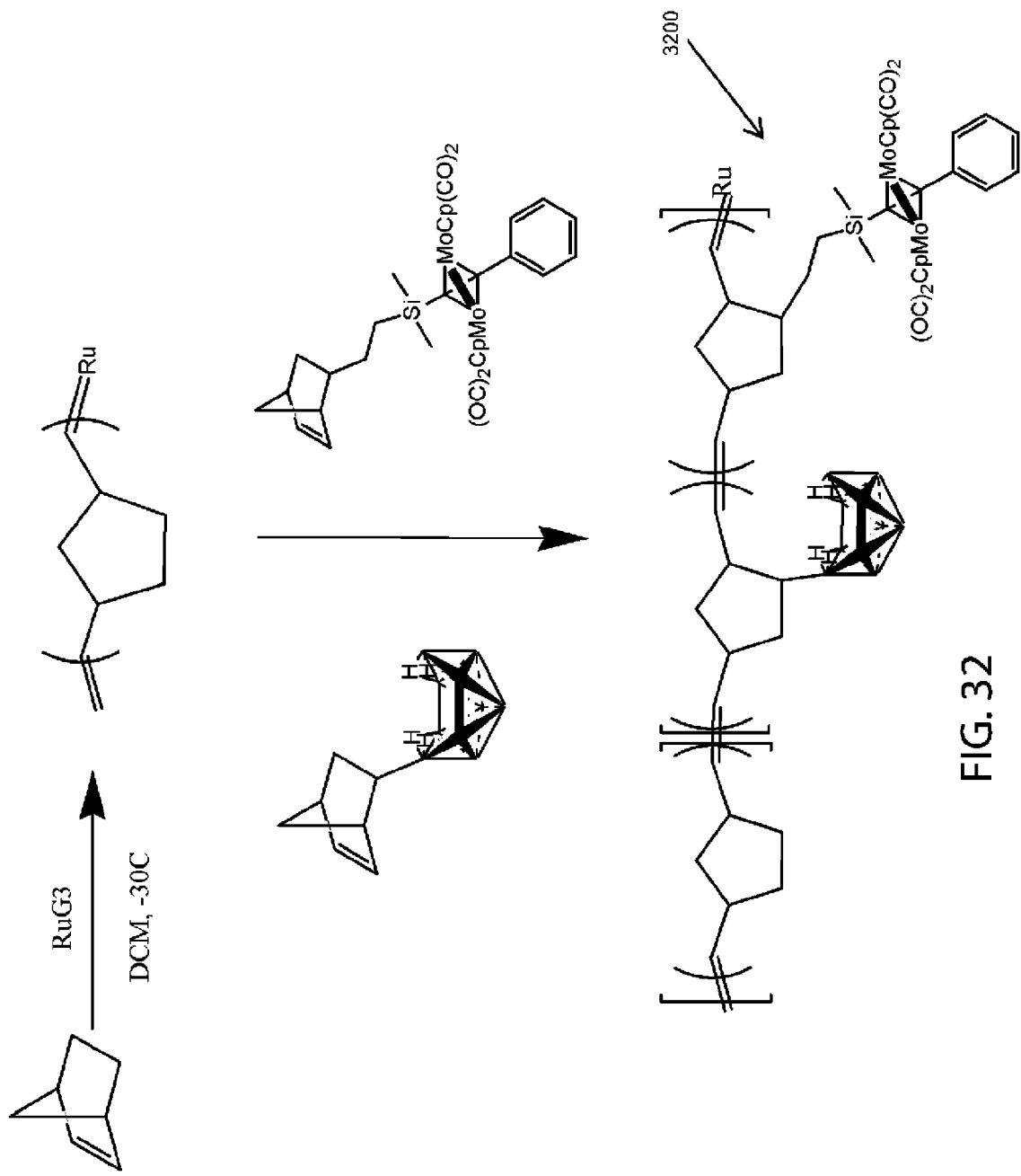
FIG. 32 depicts schematically one example of the synthesis of a tri-block copolymer by ROMP using first norbornene, then norbornene substituted with a pendant decaborane group and then norbornene substituted with a pendant molybdenum-containing organometallic moiety.
Figure 33:
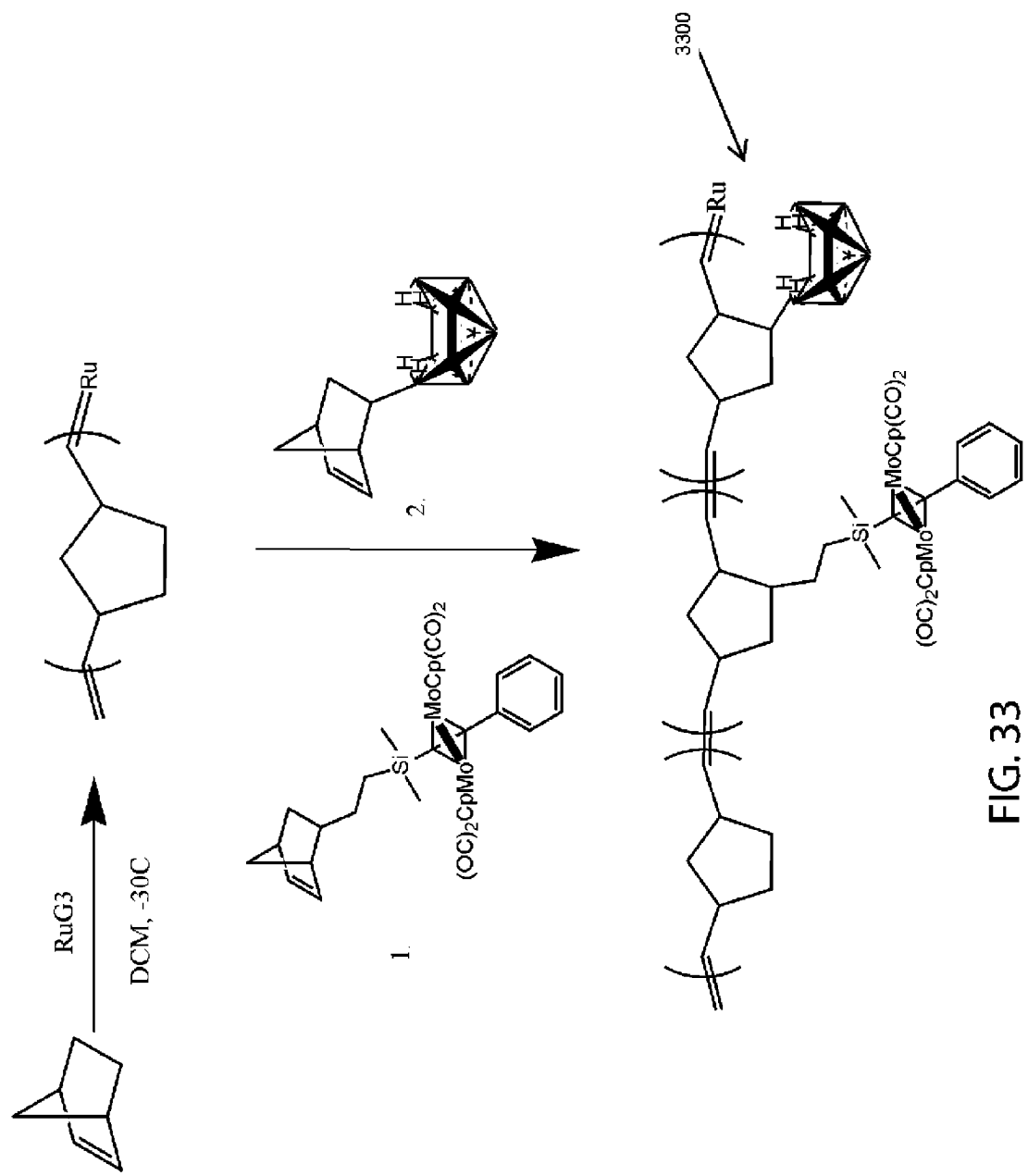
FIG. 33 depicts schematically one example of the synthesis of a tri-block copolymer by ROMP using first norbornene, then norbornene substituted with a pendant molybdenum-containing organometallic moiety and then norbornene substituted with a pendant decaborane group.

FIG. 32 depicts schematically how a di-block copolymer 3200 having a random copolymer as the second block may be formed using ROMP. First a polynorbornene block is formed from norbenene. The polymer chain is then extended by polymerization of a mixture of norbornene having a pendant decaborane moiety attached thereto and norbornene having a pendant molybdenum-containing organometallic moiety. This yields an attached block of a random mixture of the two types of norbornene having a pendant moiety. FIG. 33 depicts schematically how the same components may be used to form a tri-block copolymer 3300, in which the order of polymerization is first norbornene, then organometallic-substituted norbornene, then decaborane-substituted norbornene. By varying the order of attachment of the blocks it is envisioned that different structures may be formed during copolymer self-assembly, thus enabling the formation of different ceramics having different dispositions of molybdenum therein.

It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

The invention claimed is:

1. A block co-polymer comprising at least two blocks wherein at least one block is inorganic-based, at least one metal-containing species in elemental form is disposed in at least one of said blocks and the block copolymer comprises at least one of the group consisting of polycarborane, polynorbornene, and polynorbornenedecaborane.

2. A block copolymer according to claim 1, whenever in the form of an assembly of a collection of said block copolymer, wherein the assembly contains at least two domains each of which is formed respectively from a different grouping of said blocks, and said at least one metal-containing species which is disposed in at least one of said blocks is disposed in a domain formed from a group which includes said block.

3. A block copolymer of claim 1 wherein at least one block is organic-based.

4. A block copolymer of claim 3 wherein said at least one organic based block is selected from the group consisting of polybutadiene, polycycloctadiene, polynorbornene, polytetracyclododecene, polyisoprene, polydimethylamino ethyl methacrylate, polyethylene oxide, polyvinylpyridine, polystyrene, polyhydroxystyrene, polyphenyleneoxide, polycarbonate, polyetherimide, polypropyleneoxide, polybutyleneteraphthalate, polyethyleneteraphthalate, alkyl-substituted variations of these polymers, and combinations thereof, and said at least one inorganic-based block is selected from the group consisting of polysilazane, polycarborane, polyureasilazane, polysilane, polycarbosilane, polyborazine, polyborazylene, polysiloxane, and combinations thereof.

5. A block co-polymer according to claim 1, wherein said at least one metal-containing species is selected from the group consisting of (a) a single element and (b) a mixture of at least two metallic elements which are not bound to each other.

6. A block co-polymer of claim 1 wherein at least one metal in said metal-containing species is selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn.

7. A block co-polymer of claim 1 wherein said at least one metal-containing species is preferentially disposed within one of said blocks.

8. A block co-polymer of claim 1 wherein at least one block of the block co-polymer comprises a polymerized monomer of norbornene having a pendant moiety selected from the group consisting of an organometallic moiety and an inorganic moiety.

9. A block co-polymer of claim 1, wherein a collection of said block copolymer is assembled into at least one structure having dimensional attributes in the range of from about 1 nm to about 100 μm.

10. A block co-polymer of claim 9, wherein said at least one structure displays at least one morphology selected from the group consisting of spherical, cylindrical, lamellae, gyroid, perforated lamellae, bicontinuous, and combinations thereof.

11. A block co-polymer of claim 1, wherein said block copolymer has an architecture selected from the group consisting of a di-block copolymer, a tri-block co-polymer, multi-block co-polymer, a dendritic-linear hybrid co-polymer, star co-polymer, and combinations thereof.

12. A block co-polymer of any of claim 1, wherein at least one of said at least one inorganic-based blocks is a ceramic precursor.

13. A block co-polymer of claim 1, wherein said block copolymer has a polydispersity index in the range of about 1.0 to about 3.0.

* * * * *

UNITED STATES PATENT AND TRADEMARK OFFICE
CERTIFICATE OF CORRECTION

| | |
|---|---|
| PATENT NO. | : 7,893,165 B2 |
| APPLICATION NO. | : 11/464125 |
| DATED | : February 22, 2011 |
| INVENTOR(S) | : Malenfant et al. |

It is certified that error appears in the above-identified patent and that said Letters Patent is hereby corrected as shown below:

In Column 1, Line 42, delete "TIE" and insert -- THE --, therefor.

In Column 3, Line 63, delete "diposed" and insert -- disposed --, therefor.

In Column 4, Line 20, delete "iverse" and insert -- inverse --, therefor.

In Column 6, Line 9, delete "product" and insert -- product, --, therefor.

In Column 7, Line 11, delete "present" and insert -- present, --, therefor.

In Column 8, Line 6, delete "thereof" and insert -- thereof. --, therefor.

In Column 8, Line 18, delete "thereof" and insert -- thereof. --, therefor.

In Column 11, Line 16, delete "polymerization" and insert -- polymerization, --, therefor.

In Column 12, Line 29, delete "thereof" and insert -- thereof. --, therefor.

In Column 12, Line 65, delete "thereof" and insert -- thereof. --, therefor.

In Column 13, Line 20, delete "invention" and insert -- invention, --, therefor.

In Column 13, Line 40, delete "structure m" and insert -- structure in --, therefor.

In Column 14, Line 7, delete "segment" and insert -- segment, --, therefor.

In Column 14, Line 46, delete "thereof" and insert -- thereof. --, therefor.

In Column 15, Line 33, delete "block" and insert -- block. --, therefor.

In Column 18, Line 57, delete "(TBF)" and insert -- (THF) --, therefor.

Signed and Sealed this
Fourteenth Day of June, 2011

David J. Kappos
*Director of the United States Patent and Trademark Office*

CERTIFICATE OF CORRECTION (continued)
U.S. Pat. No. 7,893,165 B2

In Column 20, Line 14, delete "block polynorbornenedecaborane" and insert -- block-polynorbornenedecaborane --, therefor.

In Column 21, Line 8, delete "block polynorbornenedecaborane" and insert -- block-polynorbornenedecaborane --, therefor.

In Column 23, Lines 47, delete "TEF." and insert -- THF. --, therefor.

In Column 23, Lines 64-65, delete "block polybonorbornenedecaborane" and insert -- block-polynorbornenedecaborane --, therefor.

In Column 23, Line 65, delete "THBF." and insert -- THF. --, therefor.

In Column 24, Lines 14-15, delete "block -polynobornenedecaborane" and insert -- block-polynorbornenedecaborane --, therefor.